Sept. 2, 1958   C. H. JORGENSEN ET AL   2,849,862
AIR DENSITY FUEL CONTROL FOR JET ENGINE
Filed Dec. 1, 1954   22 Sheets-Sheet 8
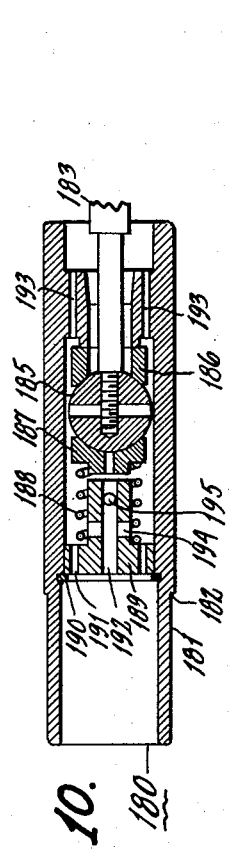
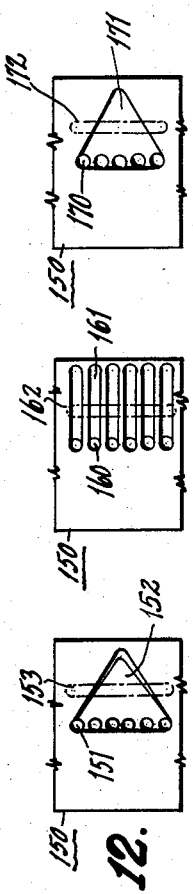
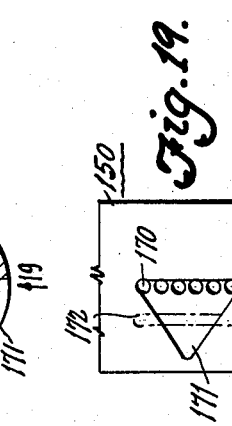
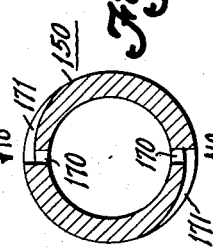
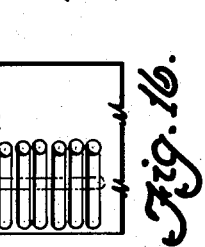
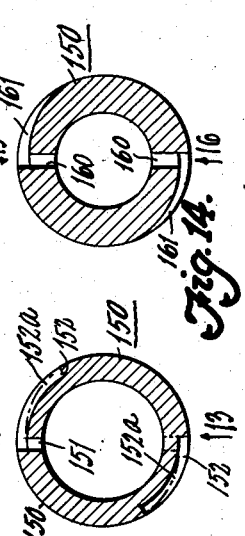
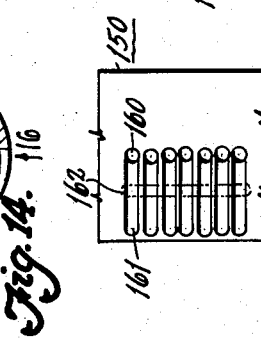
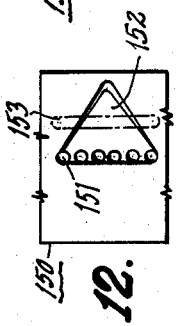
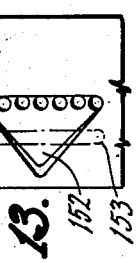
INVENTORS
Clarence H. Jorgensen, Willard J. Nickel
Howard H. Dietrich, John M. Barr
Mark Robert Rowe
by Willits Hardman and Fisher
their attorneys

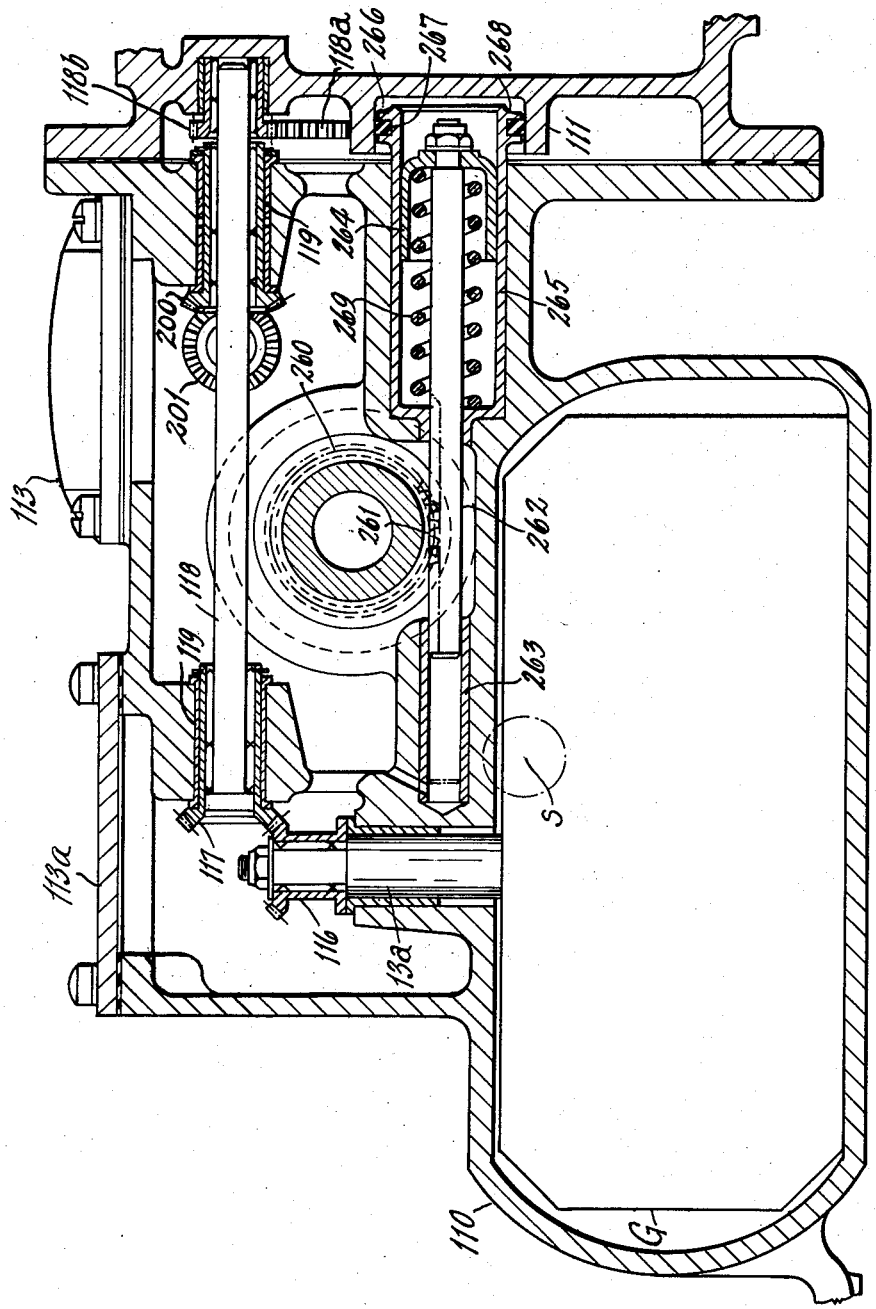

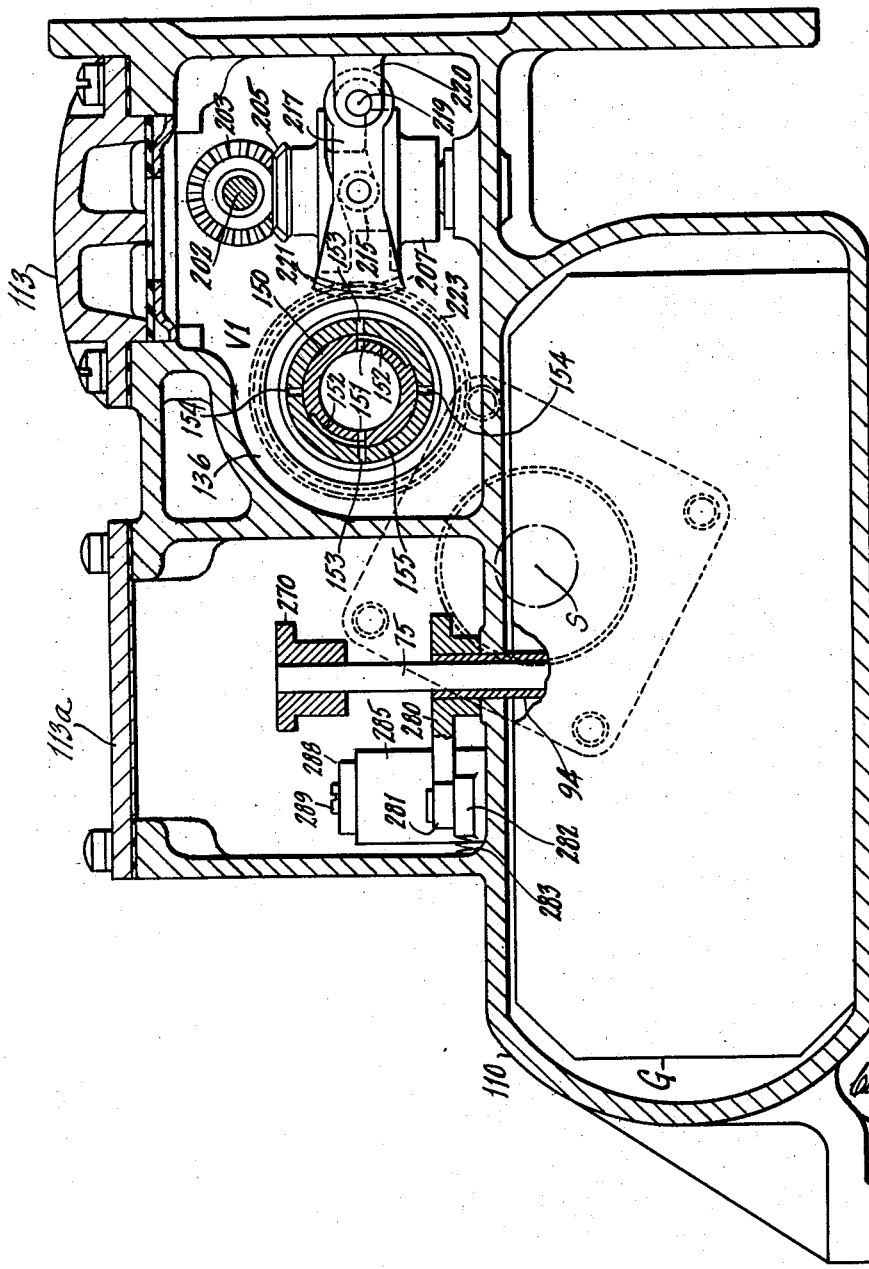

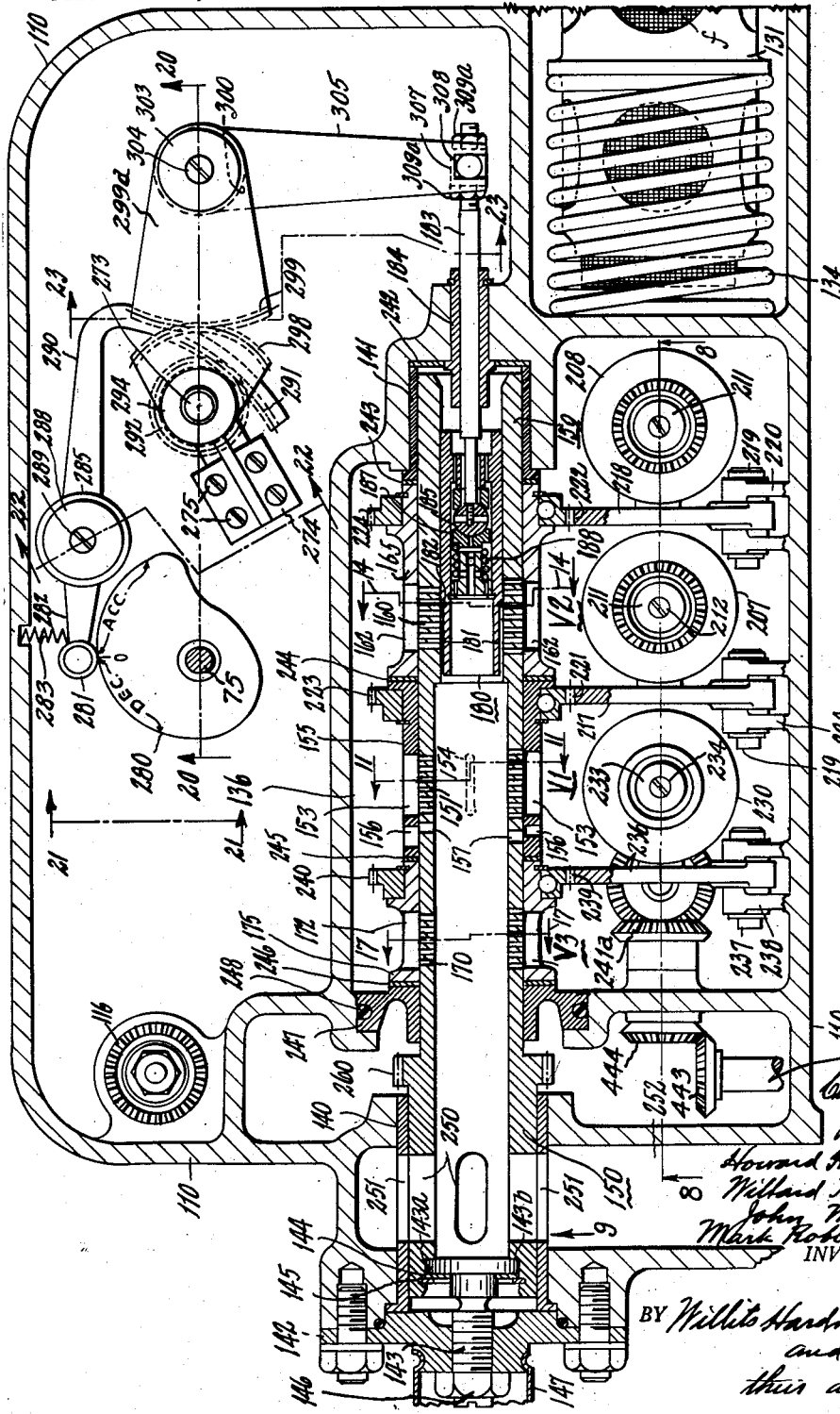

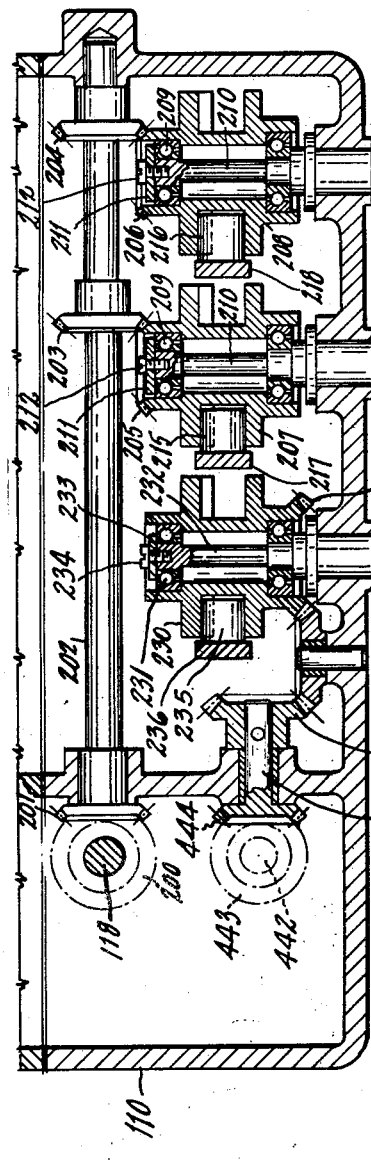
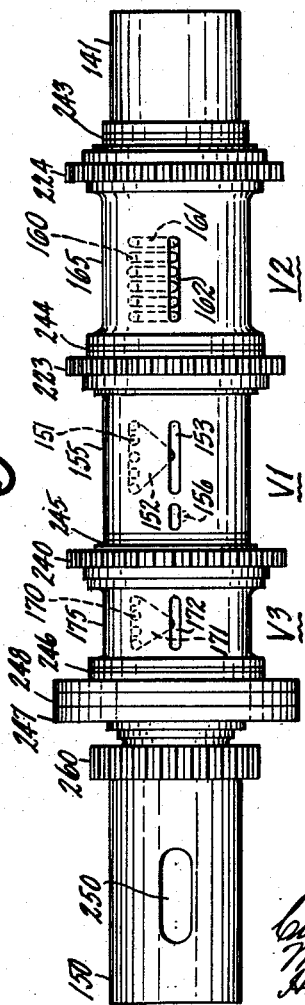

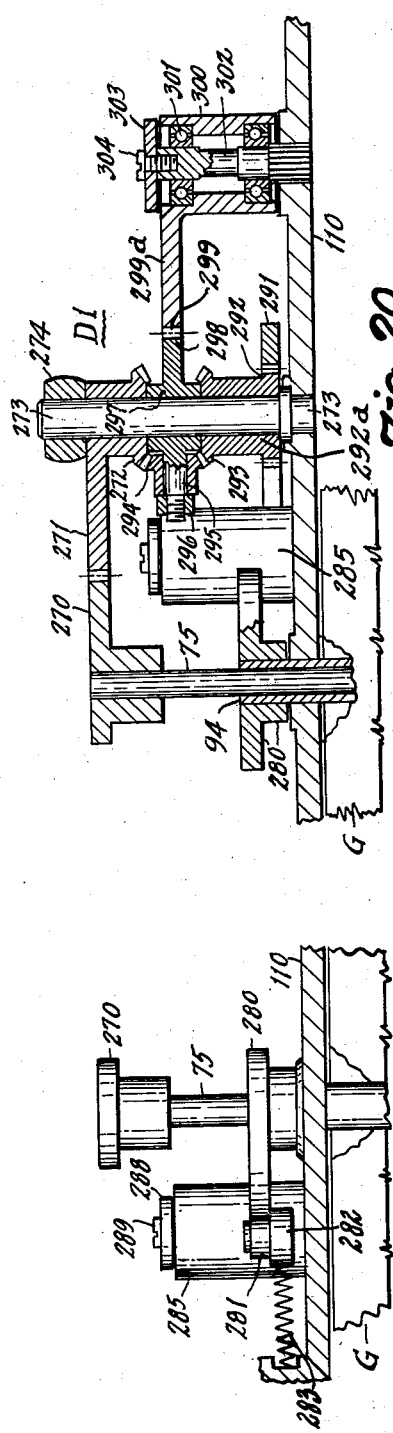

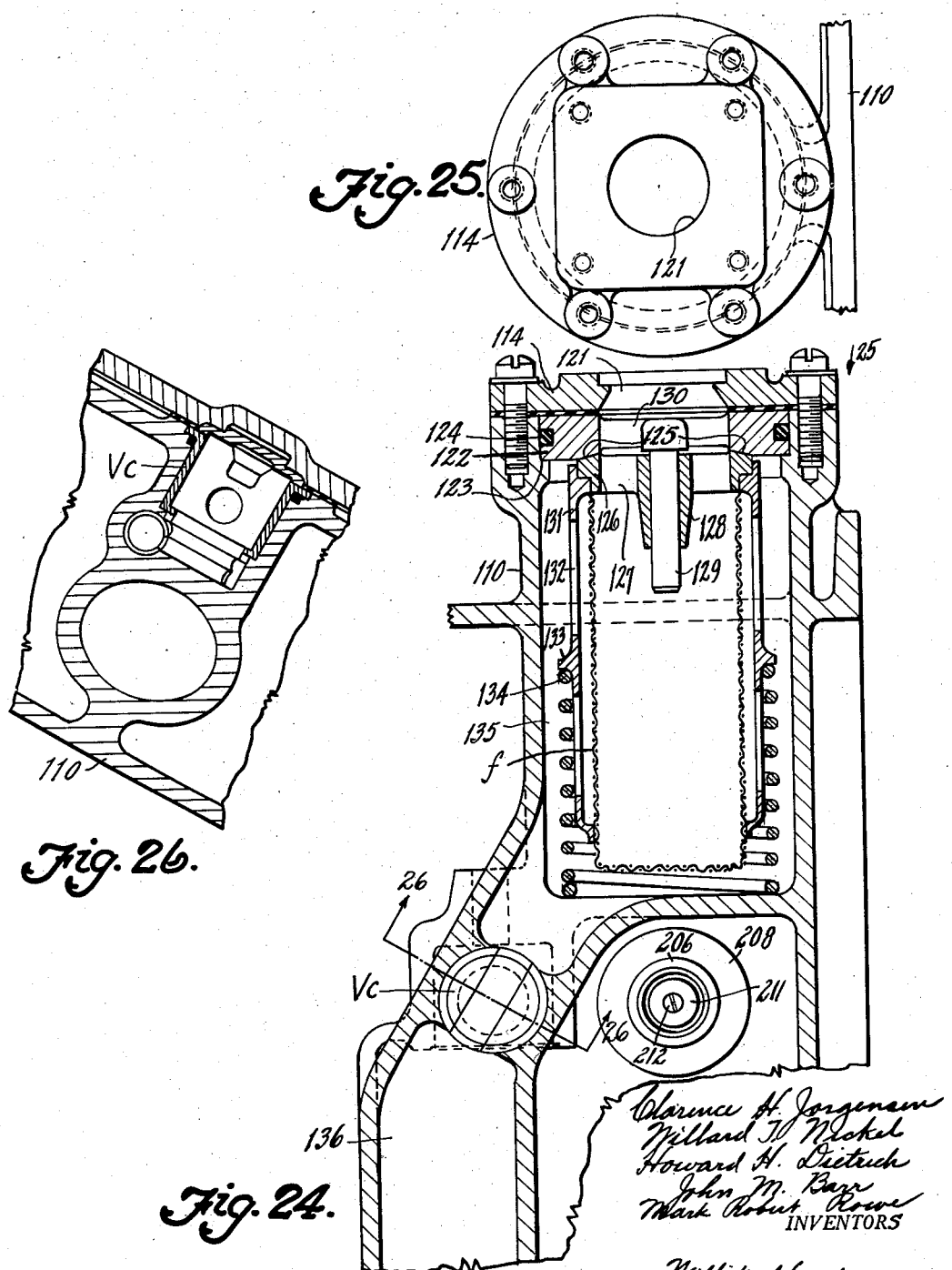

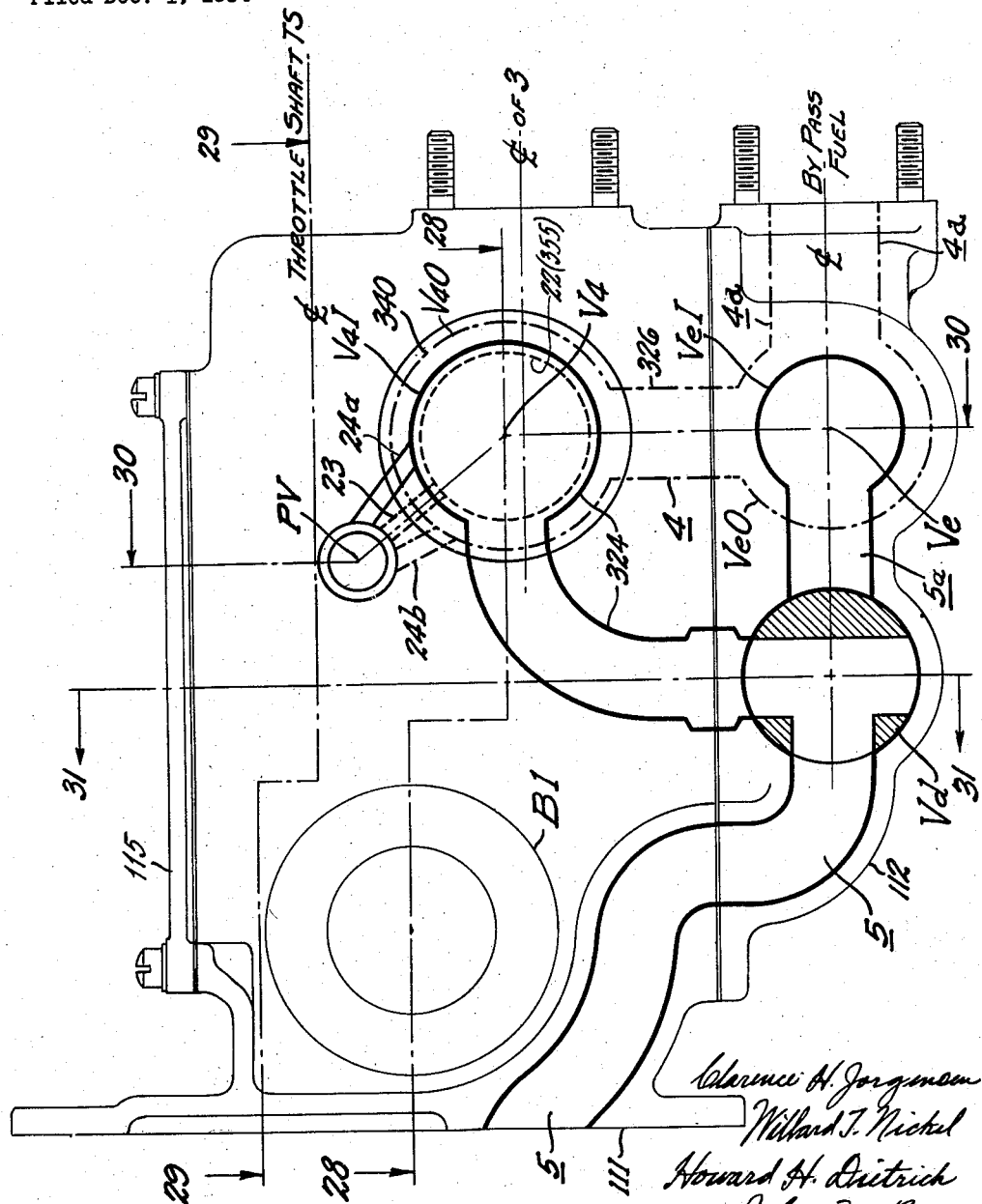

Sept. 2, 1958 C. H. JORGENSEN ET AL 2,849,862
AIR DENSITY FUEL CONTROL FOR JET ENGINE
Filed Dec. 1, 1954 22 Sheets-Sheet 17

Clarence H. Jorgensen
Willard T. Nickel
Howard H. Dietrich
John M. Barr
Mark Robert Rowe
INVENTORS BY Willits Hardman
and Fehr
their attorneys Sept. 2, 1958  C. H. JORGENSEN ET AL  2,849,862
AIR DENSITY FUEL CONTROL FOR JET ENGINE
Filed Dec. 1, 1954

INVENTORS
Clarence H. Jorgensen, Willard J. Nickel
Howard H. Dietrich, John M. Barr
Mark Robert Rowe
by Willits Hardman and Fehr
their attorneys

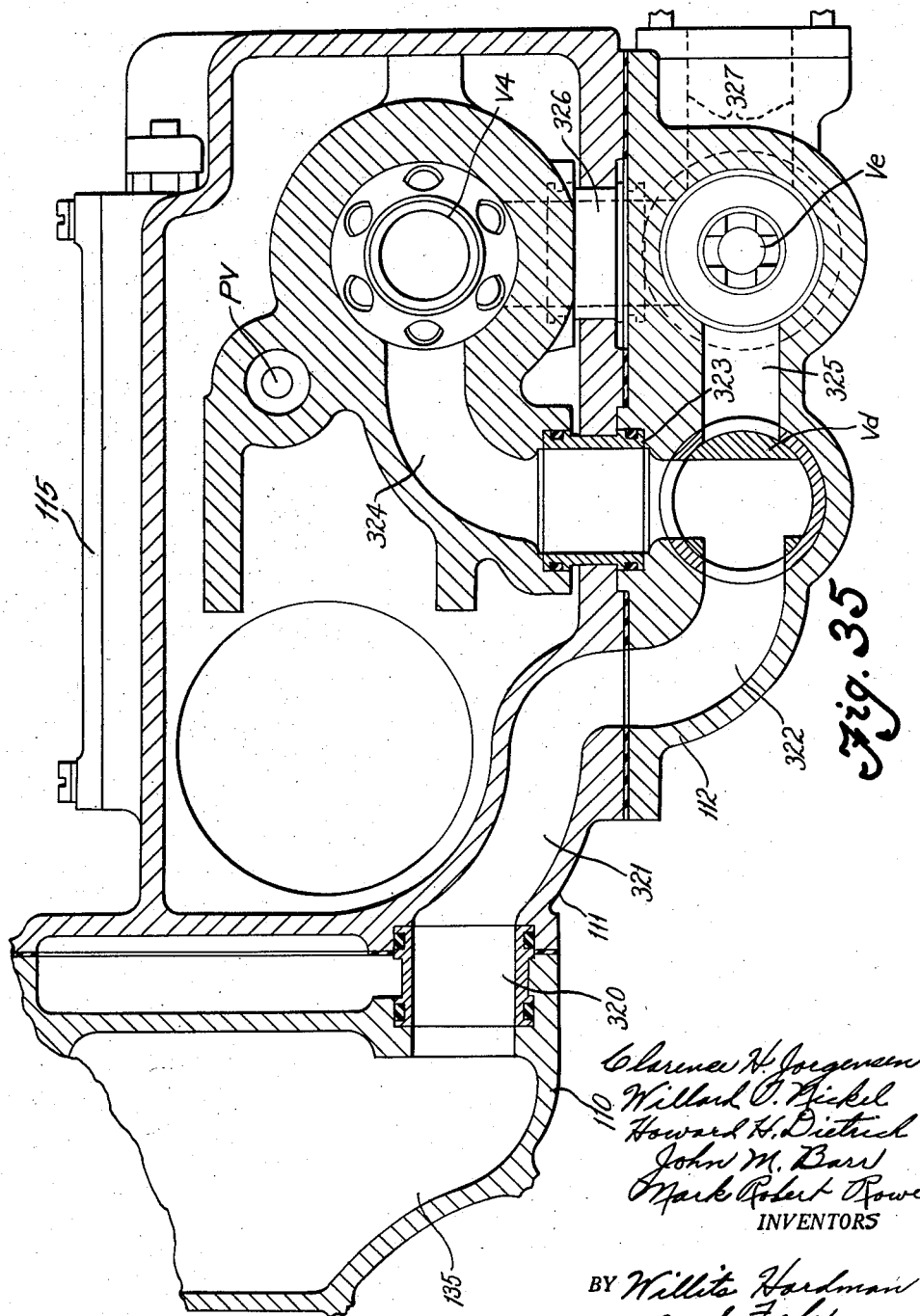

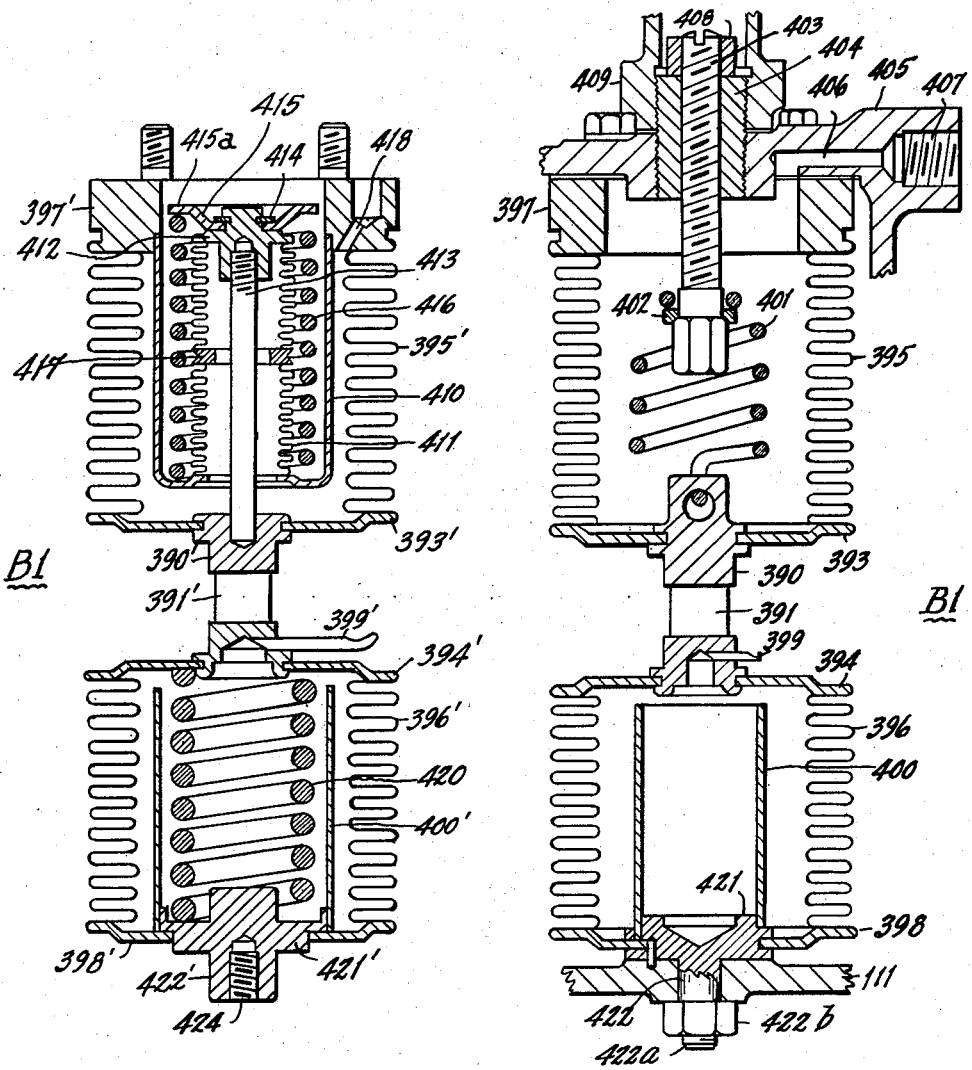

Sept. 2, 1958 C. H. JORGENSEN ET AL 2,849,862
AIR DENSITY FUEL CONTROL FOR JET ENGINE
Filed Dec. 1, 1954 22 Sheets-Sheet 21
Fig. 38.
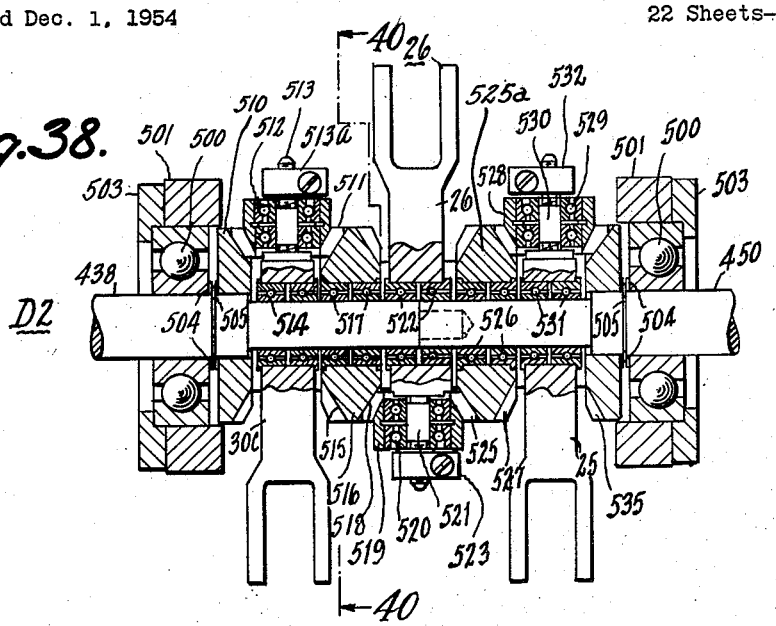
Fig. 39.
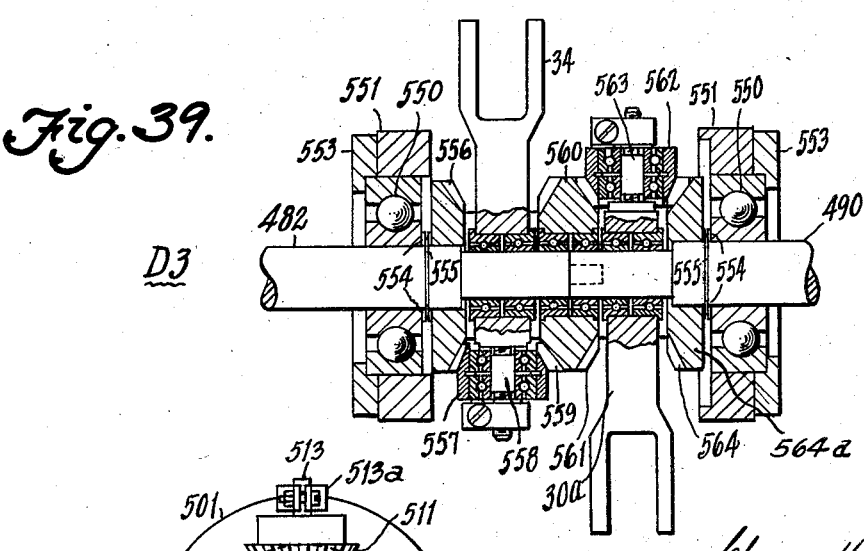
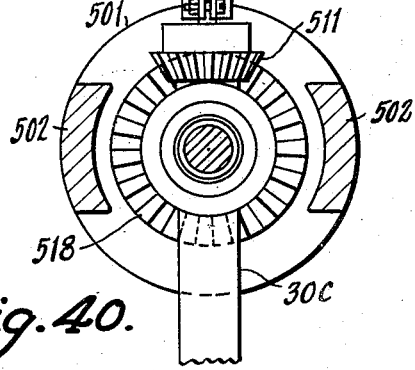
Fig. 40.
Clarence H. Jorgensen
Willard F. Nickel
Howard H. Dietrich
John M. Barr
Mark Robert Rowe
INVENTORS
BY Willits Hardman
and Fehr
their attorneys

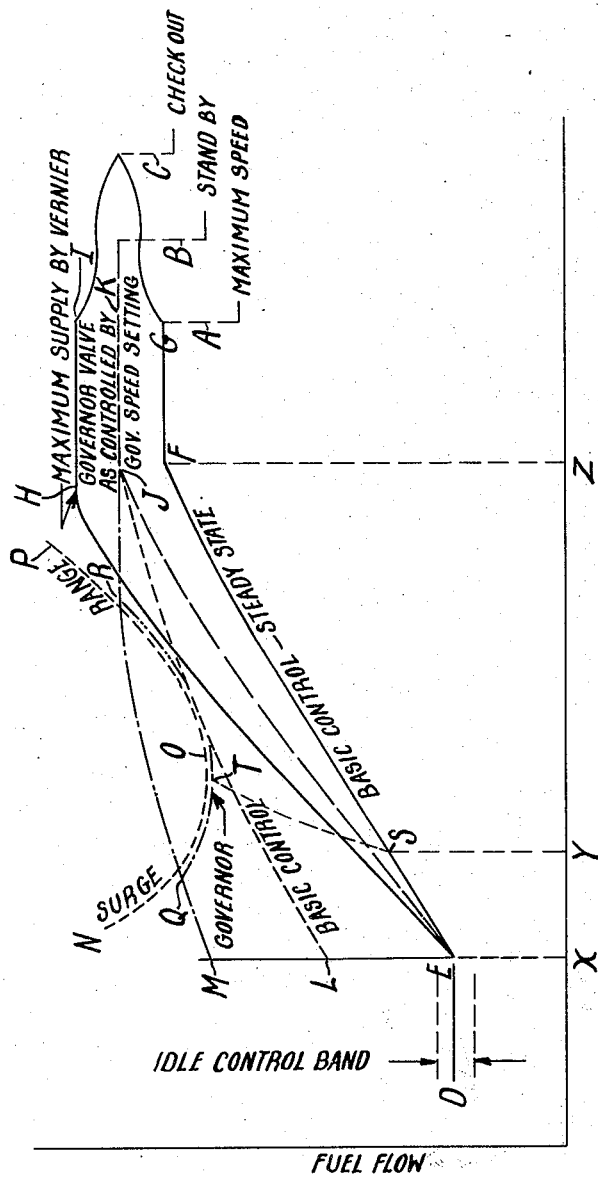
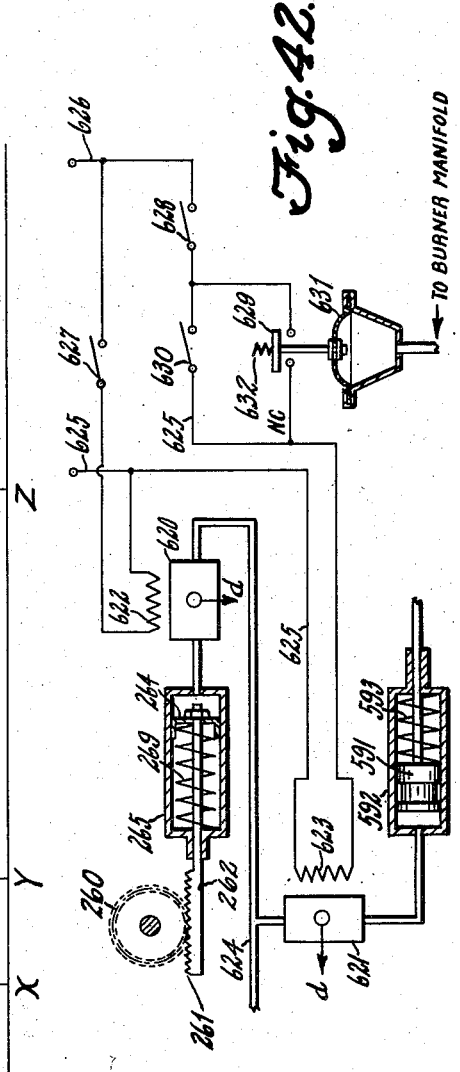

United States Patent Office 2,849,862
Patented Sept. 2, 1958

2,849,862

AIR DENSITY FUEL CONTROL FOR JET ENGINE

Clarence H. Jorgensen, East Rochester, and John M. Barr, Howard H. Dietrich, Willard T. Nickel, and Mark Robert Rowe, Rochester, N. Y., assignors to General Motors Corporation, Detroit, Mich., a corporation of Delaware Application December 1, 1954, Serial No. 472,486

6 Claims. (Cl. 60—39.28)

This invention relates to apparatus for controlling the flow of fuel to the burners of an internal combustion turbine engine.

An object of the invention is to provide a flow control unit which is under control at all times by the pilot's control lever and also under control by automatic devices which sense certain parameters affecting the operation of the engine. A further object of the invention is to provide means under control by the pilot for changing the status of the control unit in such a way that control by some of the automatic devices is removed or all control by the automatic devices is removed, leaving only the control by the pilot's control lever.

In the disclosed embodiment of the invention these objects are accomplished by a pilot controlled throttle valve in combination with a basic flow density unit which operates to establish a fuel pressure differential across the throttle valve which has a definite value for every value of compressor pressure. The basic flow density unit senses absolute compressor pressure either at the outlet or at some stage between the inlet or outlet or it may sense a combination of compressor inlet and outlet pressures. The flow density unit also senses ambient air or compressor inlet air temperature and the extent of main throttle valve opening. The flow density unit includes a variable by-pass around the fuel pressurizing pump, said by-pass being controlled by a valve the position of which is determined in accordance with fuel pressures on both sides of the throttle valve and by the means which senses compressor pressure, ambient air temperature and extent of main throttle opening.

The bulk of the fuel passing to the burners passes through a pilot controlled main throttle valve which determines approximately the amount of fuel required to effect engine operation at a selected speed. Additional fuel flows through a first vernier valve which is under control by the pilot's lever to obtain vernier adjustments in proportion to fuel admitted by the main throttle valve, and is under control by a governor to tailor the fuel flow to the amount required for a selected speed and under control by a device which also tailors the fuel flow to prevent surge during acceleration and to provide proper fuel supply to the burners during deceleration. Some of the fuel flows through a second vernier valve which directly tailors fuel flow in accordance with compressor pressure.

The unit provides for control under the following conditions:

A. Control by the pilot's lever which is stopped by a sector gate for the maximum speed setting.

B. Control by the pilot's lever after having been moved sidewise through the gate and rotated beyond the position of maximum speed setting in order to recondition the first vernier valve so that the governor operates in a narrow control band.

C. Semi-automatic control effected by closing an electric switch. Control by the first and second vernier valves is removed and control by the governor is removed. Control of fuel flow is obtained only by the pilot controlled main throttle valve in conjunction with the basic flow density unit. When the pilot's lever is moved further in the same direction as in B, the control which is established is known as "check out" because it determines the reliability of the governor to maintain the maximum speed setting.

D. Emergency control effected by closing a second switch. The throttle valve remains reconditioned for control only by the pilot controlled main throttle valve. Control by the basic flow control unit is removed and an emergency by-pass is substituted. This by-pass has a definite spring loading so that the by-pass is a function of pressure differential. This substitution is effected by a two-way valve which moves when a second electric switch is closed to divert fuel by-passing from the basic flow control by-pass to the emergency by-pass.

The present invention includes provision of automatic and manual control of the two-way valve. For this purpose, the second switch mentioned in the previous paragraph is in series with a circuit including third and fourth switches in parallel. The third switch is closed in response to a device which senses a rate of fuel flow which is too low to maintain flight. The fourth switch may be closed manually at the discretion of the pilot. When preparing to take off, the second mentioned switch is closed. If, due to the misfunctioning of the basic flow control unit, the fuel flow would be too low to maintain flight, the third switch will close automatically to effect substitution of the emergency by-pass for the by-pass by the basic flow control unit. If the fuel obtained is sufficient for take-off, the third switch would not be closed, thus leaving the fourth switch to be closed in an emergency.

Further objects and advantages of the present invention will be apparent from the following description, reference being had to the accompanying drawings wherein a preferred embodiment of the present invention is clearly shown.

In the drawings:

Figure 5 is a sectional view on line 5—5 of Figure 3;

Figure 6 is a sectional view on line 6—6 of Figure 3;

Figure 7 is a sectional view on line 7—7 of Figure 4;

Figure 8 is a sectional view on line 8—8 of Figure 7;

Figure 9 is a view of a portion of the control apparatus shown in Fig. 7 and this view is in the direction of arrow 9 of Figure 7;

Figure 10 is an enlarged longitudinal sectional view of the governor controlled valve member 180 of valve V2 in Figure 7;

Figure 11 is a sectional view on line 11—11 of Figure 7 of one of the components of valve V1;

Figure 1:
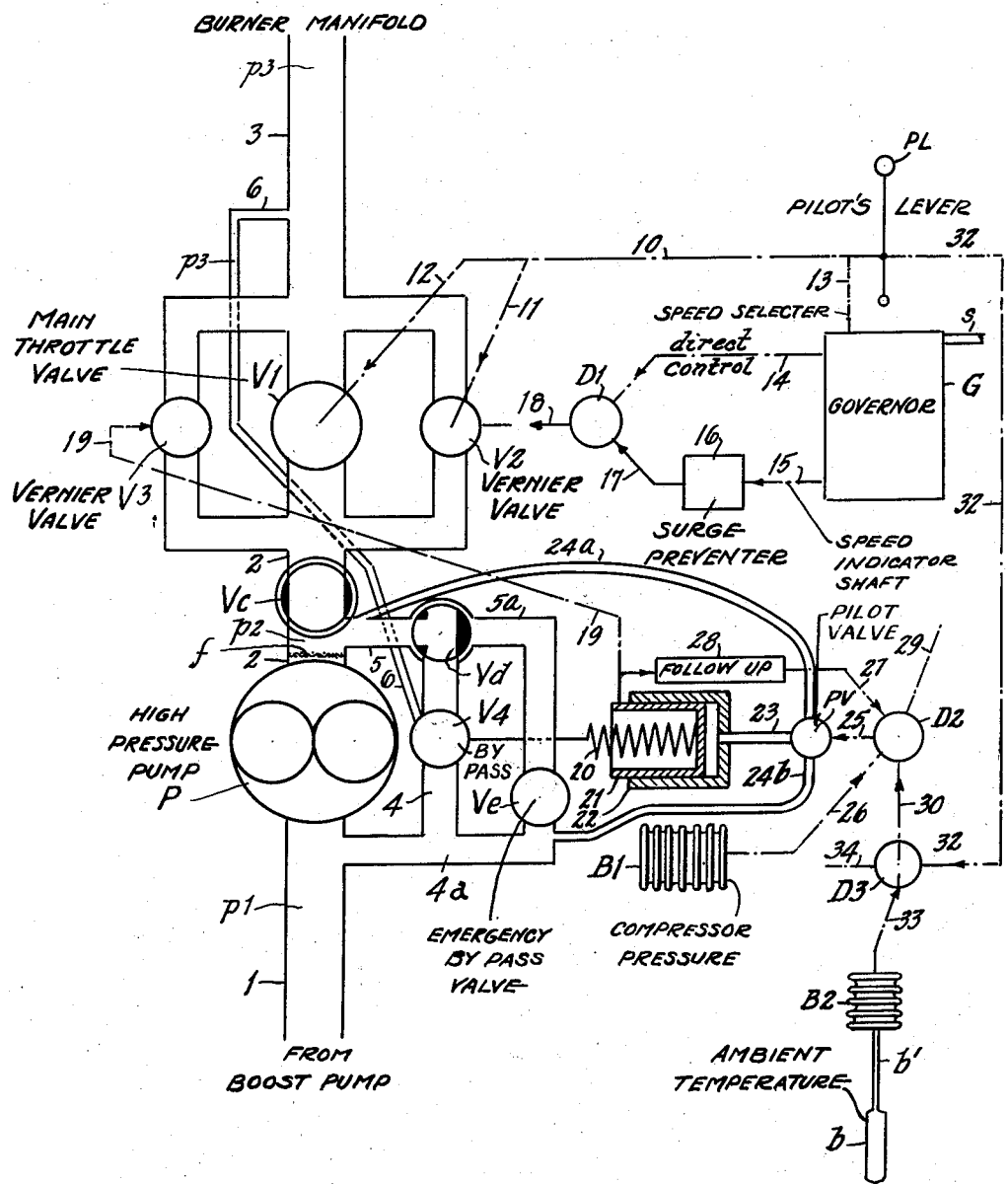
Figure 1 is a diagram of the control apparatus embodying the present invention.
Figure 3:
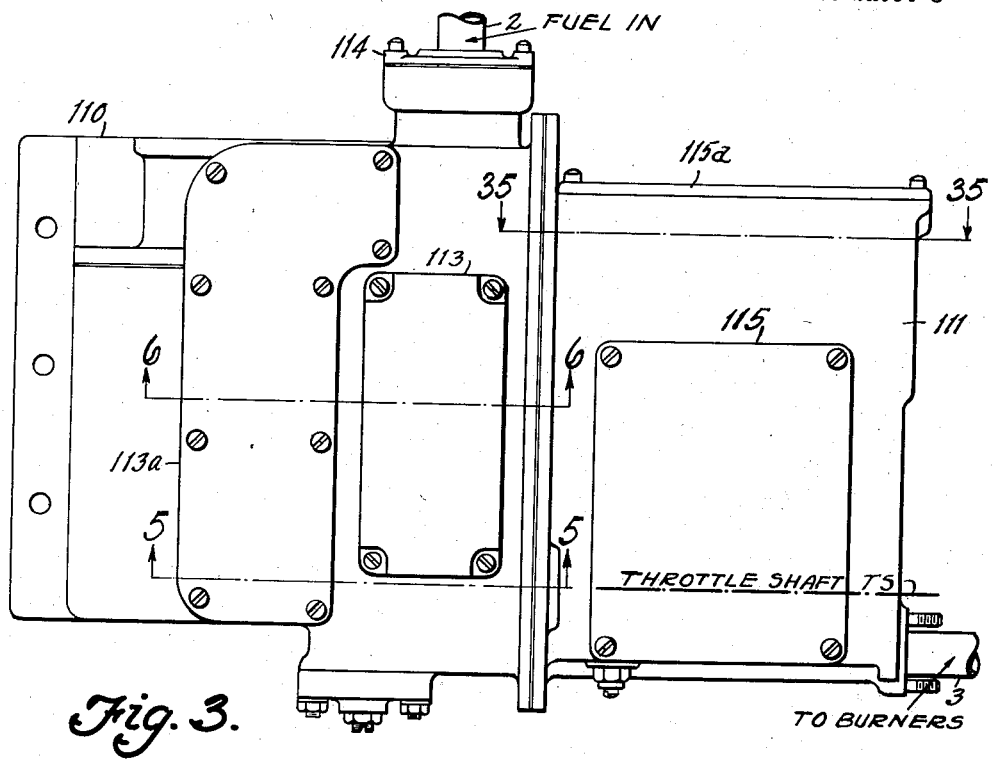
Figures 3 and 4 are plan and end views, respectively, showing the exterior of the control unit.
Figure 28:
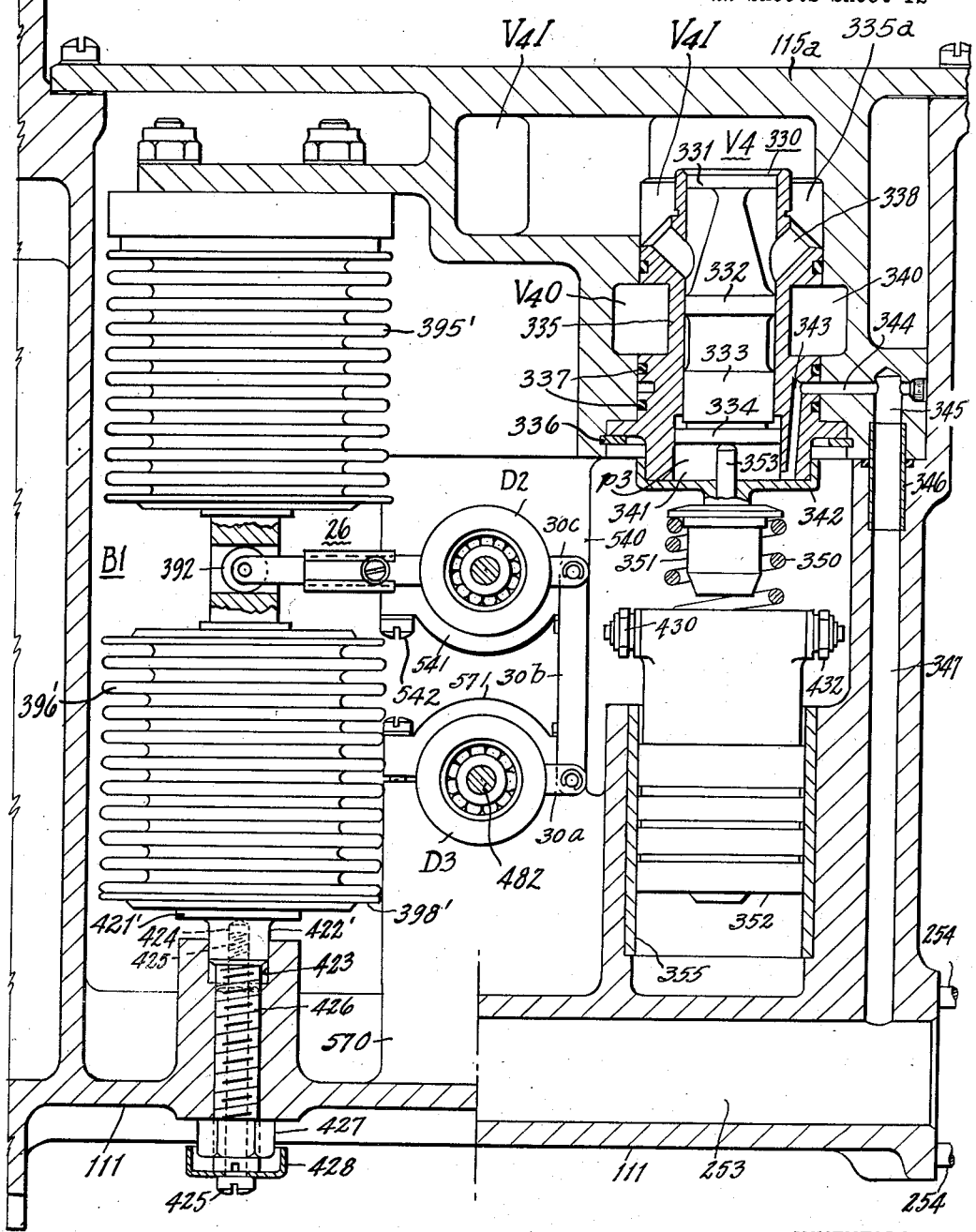
Figure 29:
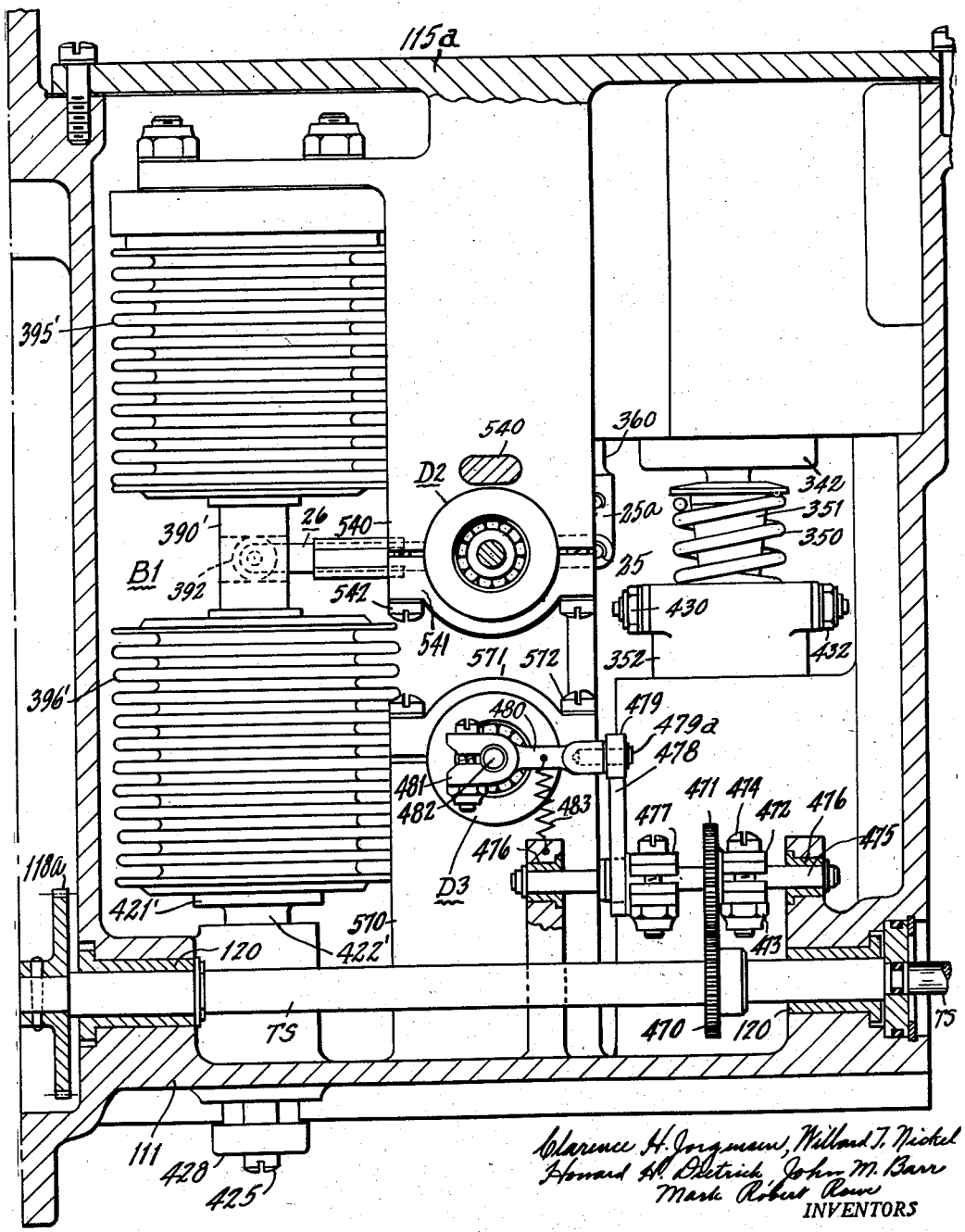
Figure 30:
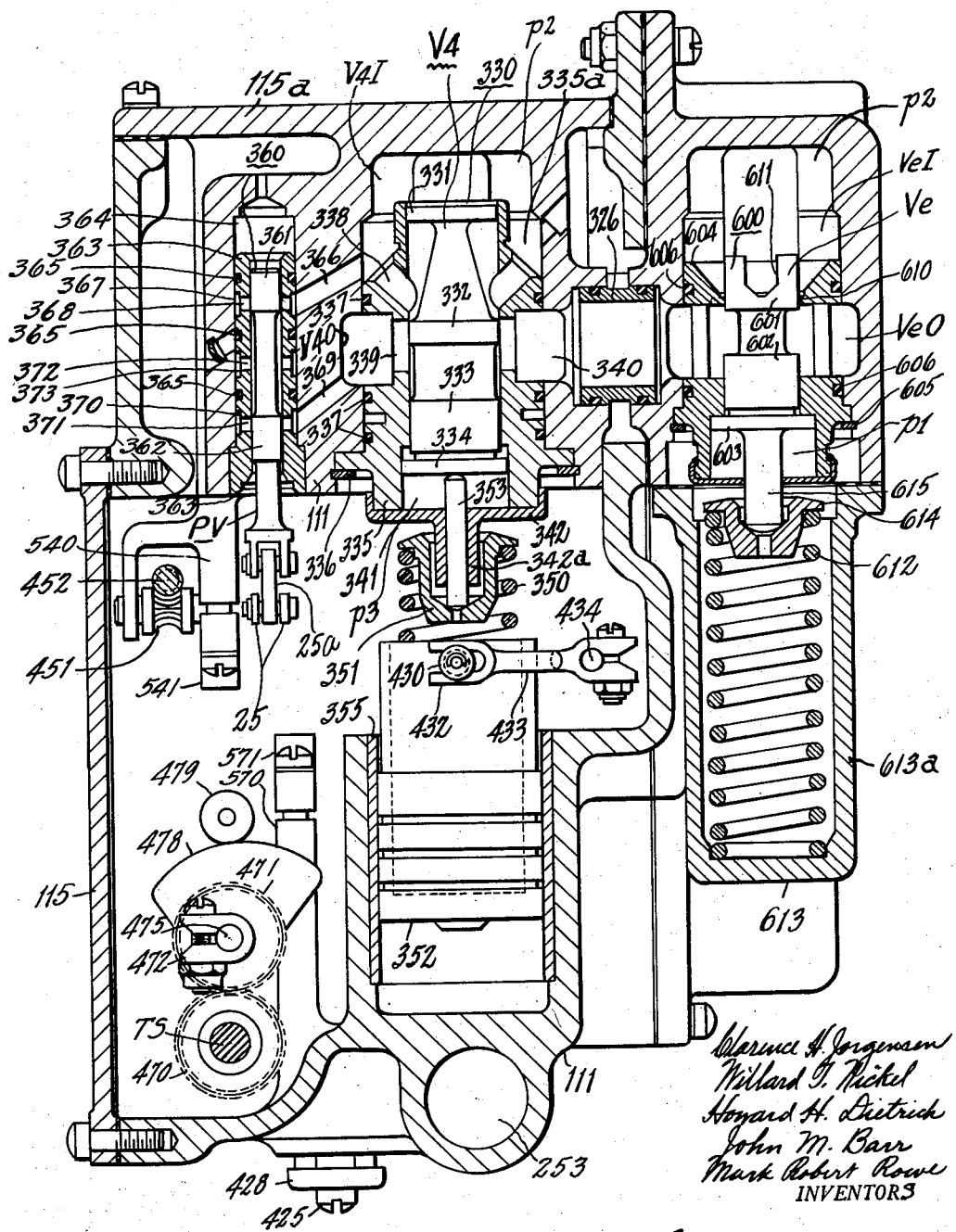
Figure 31:
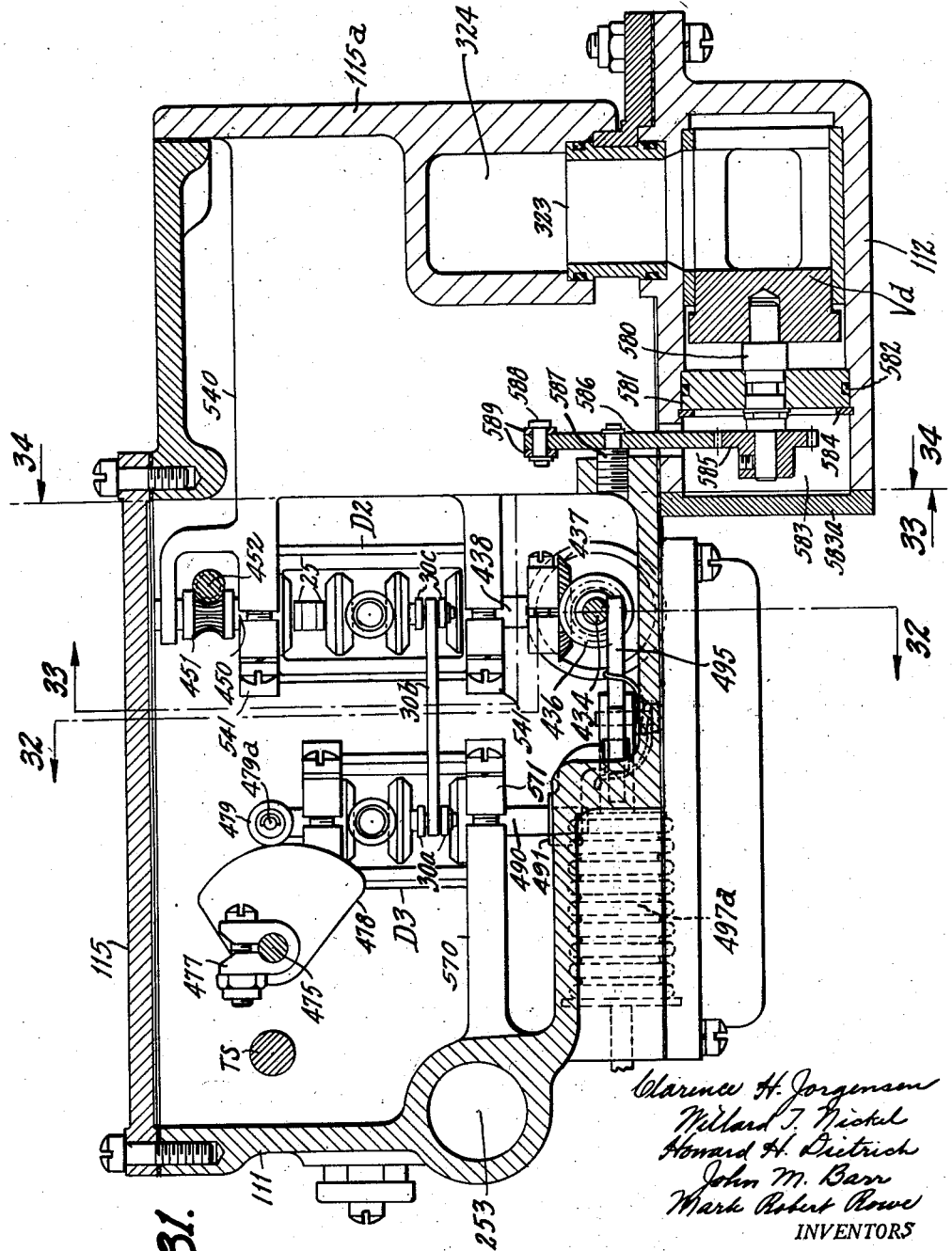
Figure 32:
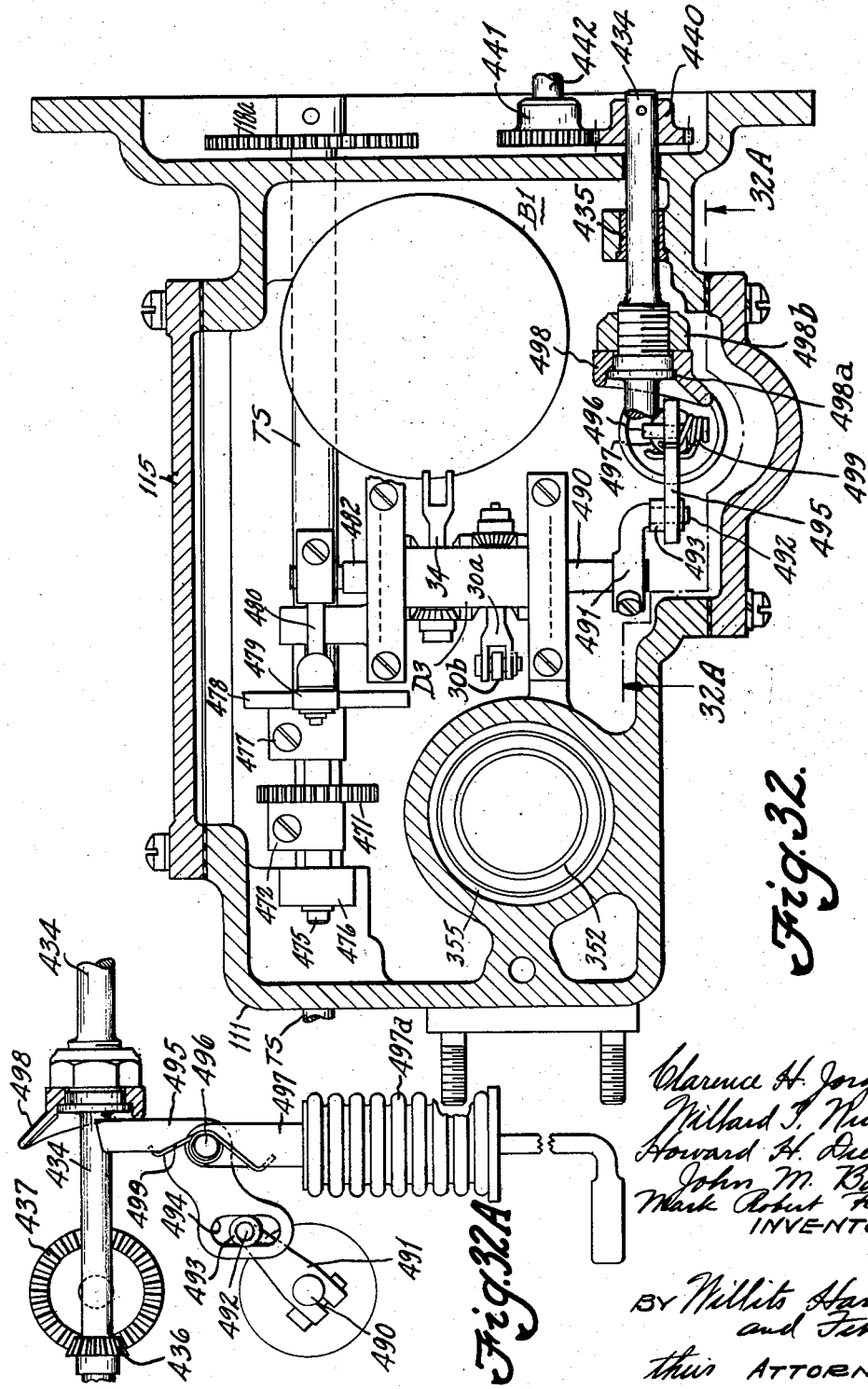
Figure 33:
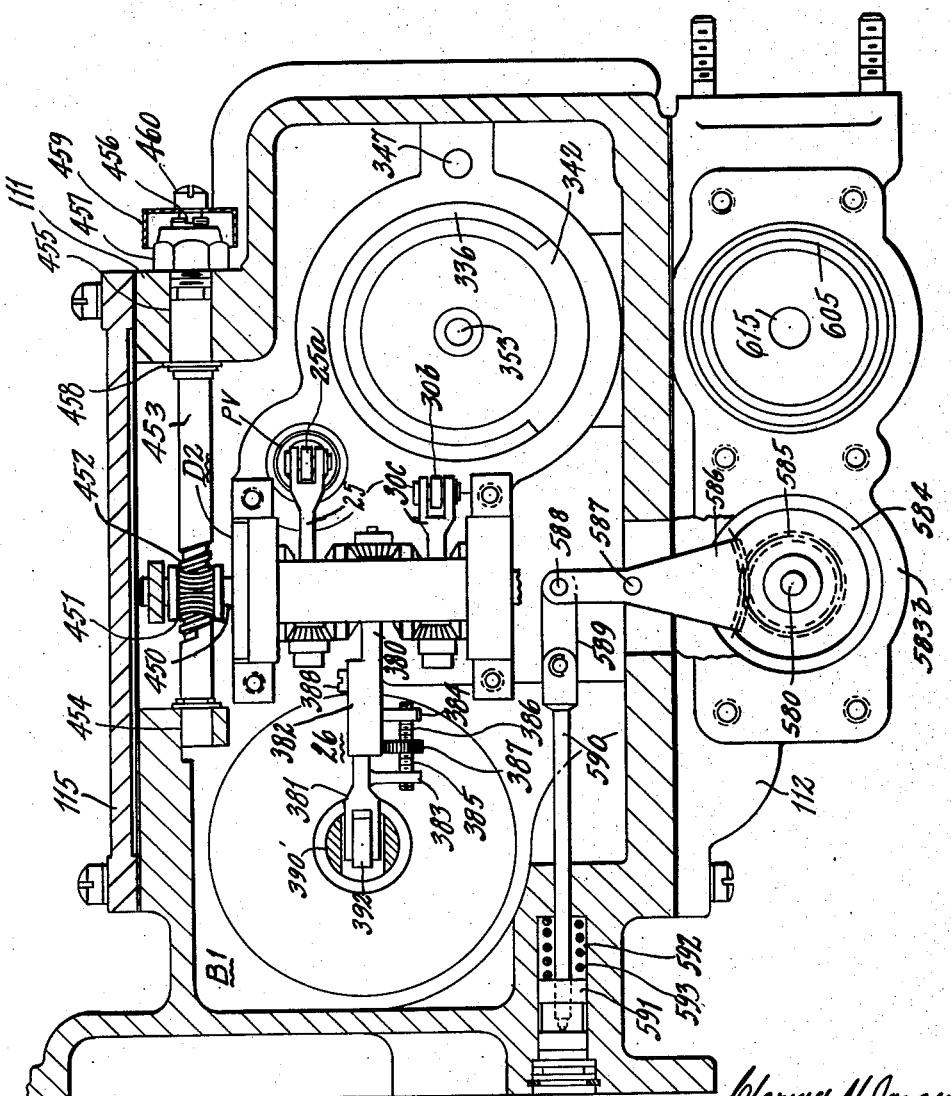
Figure 34:
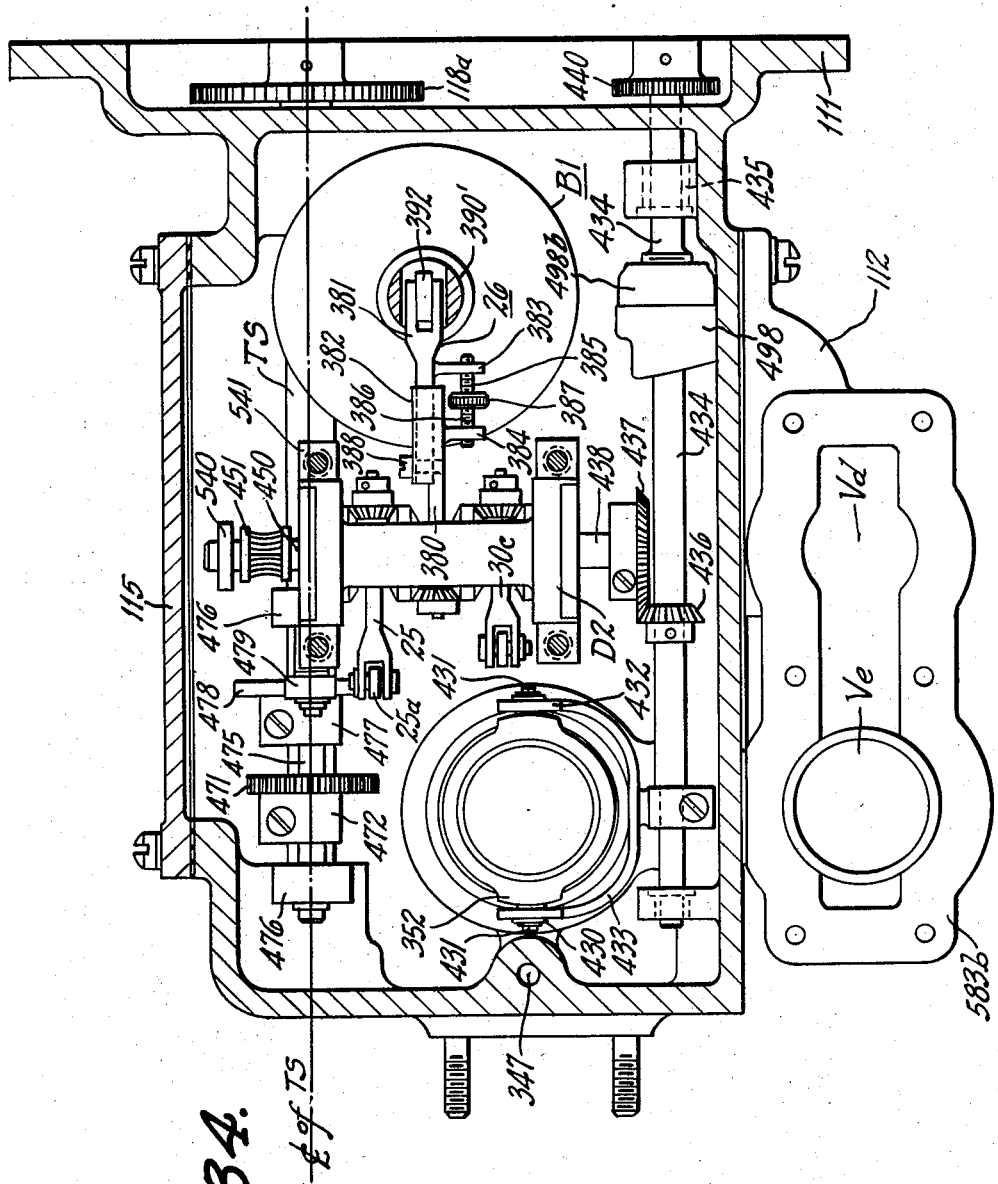

Figures 12 and 13 are views, respectively, in the direction of arrows 12 and 13 of Figure 11;

Figure 14 is a sectional view on line 14—14 of Figure 7 of one of the components of valve V2;

Figures 15 and 16 are views, respectively, in the direction of arrows 15 and 16 of Figure 14;

Figure 17 is a sectional view on line 17—17 of Figure 7 of one of the components of valve V3;

Figures 18 and 19 are views, respectively, in the direction of arrows 18 and 19 of Figure 17;

Figures 20 through 23 are fragmentary views, respectively, on lines 20—20, 21—21, 22—22 and 23—23 of Figure 7;

Figure 24 is an extension of Figure 7;

Figure 25 is a view in the direction of arrow 25 of Figure 24;

Figure 26 is a sectional view on line 26—26 of Figure 24;

Figure 27 is a diagram of ducts provided by housings 111 and 112 shown in Figure 3;

Figure 28 is a sectional view on lines 28—28 of Figure 27;

Figure 29 is a sectional view on line 29—29 of Figure 27;

Figure 30 is a sectional view on line 30—30 of Figure 27;

Figure 31 is a sectional view on line 31—31 of Figure 27;

Figure 32 is a sectional view on line 32—32 of Figure 31. Figure 32A is a sectional view on line 32a—32a of Figure 32;

Figure 33 is a sectional view on line 33—33 of Figure 31;

Figure 34 is a sectional view on line 34—34 of Figure 31;

Figure 35 is a sectional view on line 35—35 of Figure 3;

Figures 36 and 37 are longitudinal sectional views of two forms of bellows unit for the basic flow control unit;

Figures 38 and 39 are, respectively, longitudinal sectional views of calculators D2 and D3, shown in Figure 1;

Figure 40 is a sectional view on line 40—40 of Figure 38;

Figure 41 is a chart showing the operation of the control unit; and

Figure 42 is a diagram of solenoid valve control.

Referring to Fig. 1, pipe 1 connects a fuel boost pump (not shown), with a high pressure pump P which discharges through a filter $f$ into a pipe 2 connected with valves V1, V2 and V3 in parallel. The outlets of these valves are connected by pipe 3 with the burner fuel manifold. A valve Vc can be manually adjusted to meter flow through pipe 2. A normal by-pass around the pump P includes pipe 5, a pipe 4 in which the valve V4 is positioned and pipe 4a, this by-pass being operative when a two-way valve Vd is in the position shown. When valve Vd is turned clockwise 90° the pipe 4 is blocked and pipe 5 connected to pipe 5a which connects with pipe 4a and in which the emergency by-pass valve Ve is positioned to control the flow therethrough.

The flow control unit is under control of a pilot's lever PL which is mechanically connected with the movable member of valve V1 by mechanism represented by lines 10 and 12 and with a first movable member of valve V2 by mechanism represented by lines 10 and 11 and with the speed setting device of a governor G by mechanism represented by lines 10 and 13. Governor G which is driven by the engine through a shaft S, effects movement of a part of calculator D1 through a mechanism represented by line 14, said movement being effected to supply fuel to meet the requirements of a selected speed. Governor G puts out a speed indicating signal through a mechanism indicated by line 15 to a device 16 which serves as a surge preventer during acceleration and as means for properly controlling fuel supply to the fuel burners during deceleration. The device 16 puts out a signal to calculator D1 through a mechanism represented by line 17. Calculator D1 combines the signals received from mechanisms 14 and 17 to put out a signal to a second movable member of valve V2 through a mechanism represented by line 18. The function of valve V2, therefore, is to tailor the fuel flow as controlled by the setting of valve V1 by vernier adjustments which are controlled by lever PL and also in accordance with the signals put out by governor G.

Valve V3 is also a vernier valve which effects vernier adjustments of fuel flow in response to variations in compressor pressure and is operated through a mechanism represented by line 19, the operation of which is controlled by such variations.

By-pass valve V4 includes a movable member the position of which is determined in accordance with pressure $p2$ in pipe 2 and with pressure $p3$ in pipe 3 which has a connection with valve V4 through pipe 6 and also in accordance with the force of a compression spring 20 the force of which is determined by the position of a piston 21 movable in a cylinder 22 and having a connection by pipe 23 with a pilot valve PV which can operate to connect pipe 23 with a pipe 24a connected with pipe 2 or with a pipe 24b connected with pipe 4. When the system is balanced, the valve PV blocks pipe 23 from pipes 24a connected with pipe 2 or with a pipe 24b connected with pipe 4. When the system is balanced, the valve PV blocks pipe 23 from pipes 24a and 24b. The status of valve PV is determined by a calculator which effects movement of the valve PV through a mechanical connection represented by the line 25 in Fig 1. A part of calculator D2 is moved by a bellows which senses absolute compressor pressure, and moves in response to variations in such pressure, through the medium of a connection designated 26 in Fig. 1. When such part of the calculator D2 is moved by the connection 26, it effects movement of the valve PV through the connection 25 to a position determined by the pressure effective on the bellows. This will cause a change in fuel flow to be effected by mechanism later described and when this change is effected, the valve PV is restored to its neutral or equilibrium position by a follow-up mechanism which is designated by the number 28 on Fig. 1 and is operated by the piston 21 and operates through a mechanical connection designated by the line 27 on Fig. 1.

The movement of the operating connection 25 by the calculator D2, in accordance with the action of the bellows unit B1 may be modified in accordance with the position of the pilot's lever PL through a mechanical connection, designated by the line 32 on Fig. 1, between the lever PL and a calculator D3 which moves a part of calculator D2 through a mechanical connection designated by line 30 of Fig. 1.

A part of calculator D3 is also moved by a mechanical connection, designated by the line 33 in Fig. 1 extending from a bellows B2 that is connected with a bulb $b$ located in heat receiving relation to ambient air or air at the compressor inlet. The bulb $b$, pipe $b^1$ and bellows B2 are all filled with a liquid having a relatively high temperature coefficient of expansion. Upon variation in temperature, movements of the bellows B2 effect movements of a part of calculator D3 and this effects movement of the mechanical connection between calculators D3 and D2, represented by line 30 in Fig. 1, which brings about movement of a part of calculator D2 resulting in movement of connection 25 to move valve PV in accordance with variations in air temperature. Therefore, the valve PV is moved in accordance with variations in compressor pressure, variations in ambient air temperature and changes in position of the control lever PL.

The calculator D2 has a connection represented by line 29 which can be manipulated for purpose of an initial adjustment. Calculator D3 has a connection represented by line 34 which may be fixed in a position of initial adjustment or may be connected to be moved in response to movement of some other parameter sensing device.

Since a part of the calculator D2 is moved in response to changes in compressor pressure and through connection 25 actuates valve PV to control the piston 21, the latter will have a location which is at least partly determined by compressor pressure. Also, since a connection between the piston 21 and the movable element of valve V3, as represented by line 19, is effective to move valve V3, said valve will be moved to a position to control fuel flow in accordance with compressor pressure.

Figure 2:
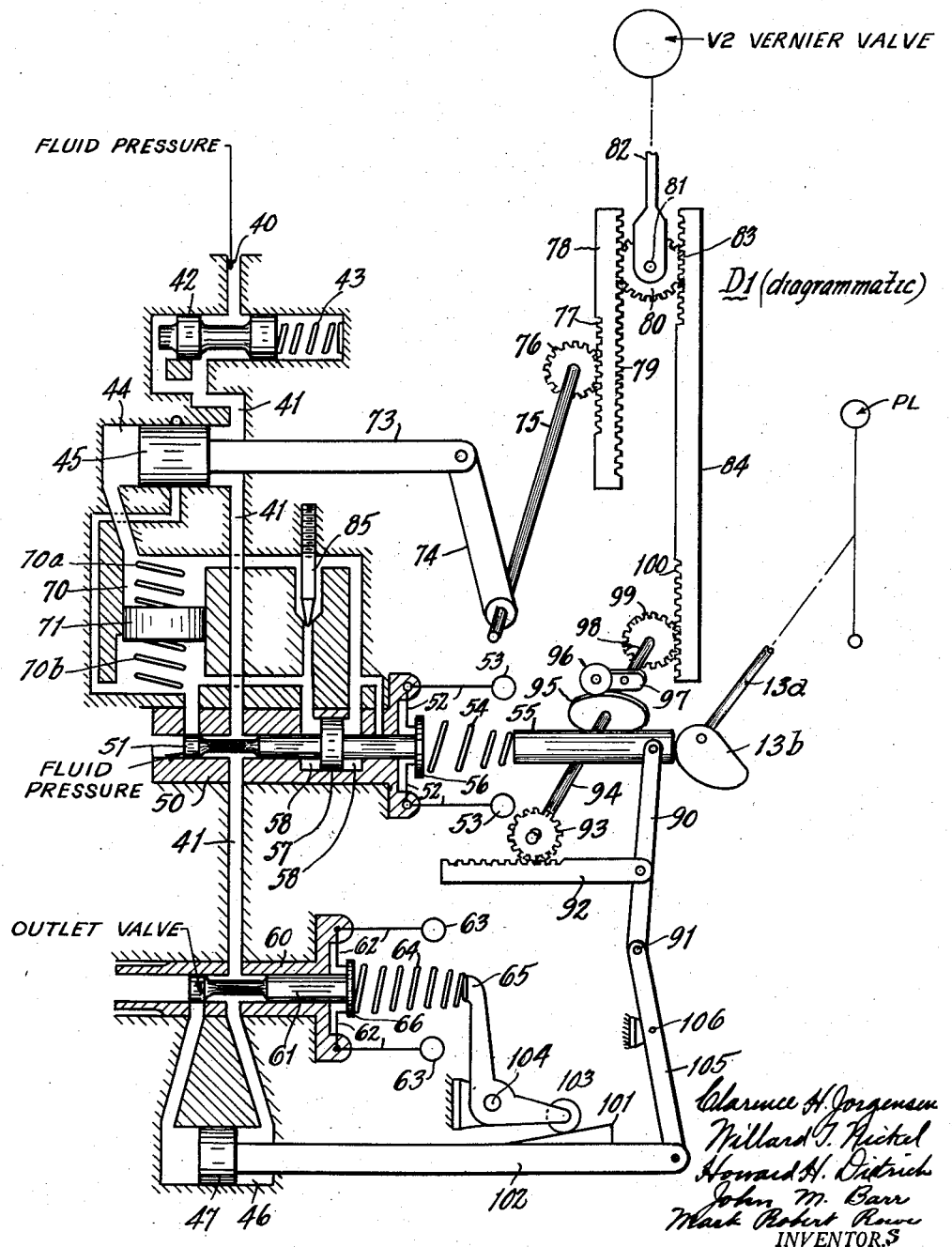
Figure 2 is a diagram of a governor, G, shown in Figure 1, together with the devices controlled thereby.

Governor G, shown diagrammatically in Fig. 2, includes hydraulically operated parts. The hydraulic fluid is the turbine fuel at burner manifold pressure. This fluid enters duct 40 connected with duct 41. Flow into duct 41 is controlled by a pressure regulating valve 42 under control by a spring 43 to regulate the pressure in duct 41 to any suitable value, for example, about 100 p. s. i. Duct 41 connects with sleeves 50 and 60 surrounding fly-ball operated valves 51 and 61, respectively. Sleeves 50 and 60 are connected with the engine by suitable gearing, not shown. It will be understood that the duct connections with these sleeves are maintained as shown during rotation of the sleeves.

Sleeve 50 pivotally supports bell-crank arms 52 carrying fly-balls 53 which separate, as speed increases, against the action of a spring 54 confined between a rod 55 and a pad 56 attached to valve 51. Valve 51 includes a piston 57 in a cylinder 58 formed in sleeve 50.

Sleeve 60 pivotally supports bell-crank arms 62 carrying fly-balls 63 which separate, as speed increases, against the action of a spring 64 confined between a lever 65, provided for a purpose later set forth, and a pad 66 attached to valve 61.

Duct 41 also connects with right end of cylinder 44 which receives a piston 45 and with right end of cylinder 46 which receives a piston 47. The pressure fluid in duct 41 exerts no moving force on valves 51 and 61 since they are in balance with respect to the pressure of fluid received from duct 41. So long as the valves 51 and 61 are in the positions shown, the fluid at the left ends of cylinders 44 and 46 is trapped and no movement of the pistons 45 and 47 occurs.

If the fuel supplied to the burners should be in excess of that required to maintain the speed for which the governor is set, engine speed will increase and valve 51 moves right and the lower end of a cylinder 70 is connected with a drain at the left of valve 51. Cylinder 70 contains a buffer piston 71 normally balanced between springs 70a and 70b.

Therefore, when cylinder 70 is connected with the drain, piston 71 moves down to push fluid from the lower end of cylinder 70 and to cause more fluid to be received in the upper end of cylinder 70. Piston 45 then moves left to cause decrease of fuel flow by causing left movement of piston rod 73, counter-clockwise rotation of a lever 74, a shaft 75 and a pinion 76, and upward movement of a rack 77 formed on a bar 78 having a second rack 79 which meshes with a pinion 80 pivotally supported at 81 by a bar 82. Pinion 80 meshes with a rack 83 formed on a bar 84. Therefore, when piston 45 moves left, bar 82 moves up to reduce fuel flow in a manner to be described in detail later.

Pressure at the right end of cylinder 58 increases and valve piston 57 and valve 51 move left. This is the movement corresponding to a higher speed setting of the governor. The valve 51 thus re-centers while the speed is still above the actual speed setting. Therefore, piston 45 is prevented from moving too far in the fuel reducing direction while the overspeed error is diminishing.

The pressure at the right of piston 57 becomes equalized by the pressure at the left of piston 57 through an adjustable needle valve 85 so that the return of engine speed to normal corresponds with the return of the governor speed setting to normal and the change in speed is smooth and free from oscillations.

The same action occurs, but in the opposite sense, if engine speed falls below the selected speed.

The speed setting of the governor is changed by movement imparted by lever PL, shaft 13a and cam 13b to rod 55, the position of which controls the force of spring 54. When rod 55 is moved left to increase governor speed setting, a lever 90, pivoted at 91, pushes a rack 92 left and causes clockwise rotation of a pinion 93, shaft 94 and a cam 95. Lever 97 (carrying a cam follower 96), shaft 98 and pinion 99 rotate clockwise and rack 100 on bar 84 moves down. Therefore, pinion 80 rolls down and bar 82 lowers to increase fuel flow and engine speed increases to the value demanded by the location of rod 55. As engine speed increases, the balls 63 move out, valve 61 moves right, and piston 47 moves left. A cam 101 on piston rod 102 pushes a follower 103 up to cause lever 65 pivoted at 104 to turn counter-clockwise to increase the compression of spring 64 so that valve 61 will move left to balanced position when the demanded increased value of engine speed has been attained.

As rod 102 moves left, it moves lever 105 (pivoted at 106) clockwise to restore rack 92 to normal position during the increase of engine speed to the demanded value. During the restoring movement of rack 92, rack 84 is moving up. But, while rack bar 84 is moving up, rack bar 78 is moving down since the increase of compression of spring 54, when increased speed is demanded, results in right movement of piston 45 which is in the direction to cause fuel increase. The resultant of the downward movement of rack bar 78 and the upward movement of rack bar 84 is to cause rod 82 to move down, but at such rate, as determined by cam 95, that compressor surge will not occur during the transition from lower to higher speed.

The governor G with its speed controlling shaft 75 and its speed indicating shaft 94 is a purchased instrument and, therefore, is not per se a part of the present invention. The present invention is concerned with the use of shafts 75 and 94 in a manner such as to prevent compressor surge when the pilot selects a different governed speed.

Figure 4:
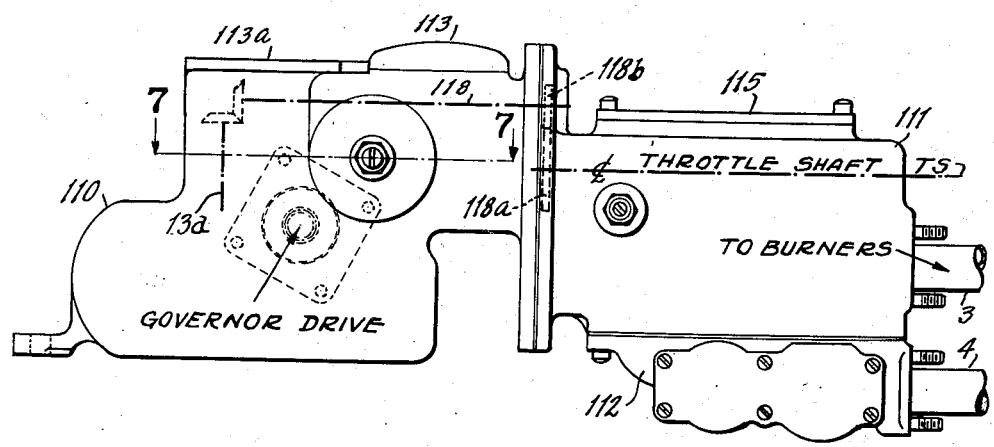

With the exception of pilot's lever PL, pump P and pipe 1, the parts of the apparatus, shown in Fig. 1, are enclosed within an assembly of housings shown in Figs. 3 and 4. This assembly includes housings 110, 111 and 112 and housing covers 113, 113a, 114, 115 and 115a. As shown in Fig. 5, housing 110 has a chamber which receives governor G whose speed selector shaft 13a (also Fig. 2) is connected by beveled gears 116 and 117 with a shaft 118 journalled in bearings 119 provided by housing 110 and connected by gears 118b and 118a with throttle shaft TS journalled in bearings 120 (Fig. 29) supported by housing 111. Shafts TS and 118 provide the connection represented by line 10 of Fig. 1 and line 13 represents the connection provided by gears 117, 116 and shaft 13a.

Referring to Fig. 24, the outlet of pump P (Fig. 1) is connected with the opening 121 in cover 114 which retains a ring 122 received by a recess 123 of housing 110 and sealed therein by an O-ring 124. Ring 122 provides seat 125 for a valve 126 having arms 127 connecting it with a hub 128 slidable on a rod 129 connected with ring 122 by arms 130. Valve 126 is connected with a sleeve 131 having side openings 132 and having a flange 133 engaged by one end of compression spring 134 urging valve 126 against the seat 125. Sleeve 131 supports the filter f of Fig. 1. Fuel flow from pump P normally passes through the filter f and flows outwardly therefrom into a chamber 135. If the filter should become clogged and unduly resists flow of fluid through it, spring 134 will yield to permit valve 126 to separate from the seat 125 so that fuel can flow directly from opening 121 to the chamber 135. Obviously, this is an abnormal situation as the filter should be cleaned or replaced as often as necessary to prevent clogging.

The fuel forced into the chamber 135 flows through the manually adjusted metering valve Vc of Fig. 1 and thence into a manifold chamber 136 which surrounds the valves V1, V2 and V3 as shown in Fig. 7. These valves have a plurality of components, some of which are provided by a single part. Housing 110 (Fig. 7) supports in suitable recesses formed in the housing, bearings 140 and 141 for a tube 150. Bearing 140 is retained in the position shown in Fig. 7 by a cover 142 which supports a screw 143, the head 143a of which is received in a recess 143b of tube 150 and is retained therein by a washer 144 retained by snap ring 145. For a purpose to be described, the tube 150 can be shifted longitudinally by turning the screw 143 after which it is fixed in longitudinal position by the tightening of a nut 146 enclosed by a cap 147.

A portion of tube 150 provides a component of valve V1. For this purpose, tube 150 has ports 151 which, as shown in Figs. 11–13, connect the interior of tube 150 with triangular recesses 152 which may be of uniform depth or of variable depth as represented by dot-dash lines 152a. The recesses 152 cooperate with slots 153 in a valve sleeve 155. Slots 153 are the normal ports. Spaced angularly 90° from ports 153, the sleeve 155 has ports 154 which cooperate with the recesses 152 (Fig. 11) when tube 150 is rotated 90° for purposes of check-out. During the idling regime no fuel passes through ports 153 but instead, through ports 156 of sleeve 155 and ports 157 of tube 150. For purposes of idle adjustment, tube 150 can be shifted longitudinally, as above described, to vary the alignment of the ports 157 with respect to ports 156.

For its function as a component of valve V2 tube 150 has ports 160 (Fig. 14) each connected with a groove 161 of varying depth. The grooves 161 cooperate with slots 162 of a valve sleeve 165.

For purpose of its function as a component of valve V3, the tube 150 has ports 170 (Fig. 7) connected with triangularly shaped recesses 171 of varying depth which cooperate with slots 172 of a valve sleeve 175 (Fig. 7).

The drawings show the approximate angular position of the ports 153 and 156 and cooperating ports 151 in tube 150, but the exact angular relationship is determined experimentally. It may be stated, however, and it is apparent from the drawings, that the angular position of the ports 156 through which fuel is supplied for idling and the main fuel supply ports 153, is such that upon rotation of sleeve 155, the ports 153 begin to register with ports 151 before port 156 is moved entirely out of registry with port 157. The ports are arranged in this manner so that the main fuel supply ports begin to be effective before the idling fuel supply ports entirely cease to be effective, so that there will be no cessation of fuel supply in transferring from idling operation to operation on the main fuel supply.

Another component of valve V2 is a piston valve 180 having a sliding fit in tube 150 and having a portion 181 of less diameter than the internal diameter of that portion of tube 150, which receives the piston valve 180. The reduced portion extends from a shoulder 182 which blocks the ports 160 more or less according to the position of piston valve 180. The piston valve 180 is moved by a rod 183 (also Fig. 10) slidable through a bushing 184 and connected with a ball 185 received by a seat 186 and urged against it by a seat 187 which a spring 188 urges to the right. Spring 188 is confined between the seat 187 and a member 189 retained by a snap ring 190. Ducts 191, 192 are provided in the member 189 and ducts 194 and 195 are formed in the piston 180 so that both ends thereof are subjected to the pressure of fuel within the tube 150, and the piston valve 180 is balanced longitudinally with respect to fuel pressure. As shown in Figs. 7, 15 and 16, the number of ports 160 on one side of tube 150 differs from the number of ports 160 on the other side of tube 150 by one, and these ports are not exactly in line, but are slightly staggered. The purpose of this arrangement is to effect a better lateral balance of the piston valve 180. Therefore, it can move axially substantially free from the influence of the pressure of fuel. It will also be apparent from the drawings that the ports 151 and 170 differ in number on opposite sides of the tube, and are slightly staggered in the same way as the ports 160.

As described with reference to Fig. 1, valves V1 and V2 are under control by pilot lever PL. For this purpose, shaft 118 which is operated by the throttle shaft (Figs. 5 and 8) is connected by bevel gears 200 and 201 with a shaft 202 connected with bevel gears 203 and 204 meshing, respectively, with bevel gears 205 and 206 which are integral with cams 207 and 208, respectively, journalled on bearings 209 supported by rods 210 secured to housing 110, as shown in Fig. 8. These cams are retained by washers 211 secured by screws 212 to the upper ends of rods 210 above the bearings 209. The races of cams 207 and 208, respectively, receive cam followers 215 and 216 carried by levers 217 and 218 which, as shown in Fig. 7 are journalled on pins 219 supported by lugs 220 integral with housing 110. Levers 217 and 218 have formed at the other ends thereof gear segments 221 and 222, respectively, meshing, respectively, with gears 223 and 224 drivingly connected, respectively, with valve sleeves 155 and 165, as shown in Figs. 6 and 7. The races of the cams 207 and 208 have contours such that, when valve sleeves 155 and 165 rotate concurrently, the metering of fuel by sleeve 165 will be in proportion to the metering of fuel by sleeve 155.

The shaft 202 has no connection with sleeve 175 but the latter is controlled by a cam 230 journalled on bearings 231 (Fig. 8) supported by a rod 232 and retained by a washer 233 which a screw 234 attaches to the rod. The cam 230 has a race formed thereon which receives a roller 235 carried by a lever 236 journalled on a pin 237 (Fig. 7) supported by lugs 238. The opposite end of lever 236 has a gear segment 239 formed thereon which meshes with a gear 240 connected with sleeve 175. The cam 230 (Fig. 8) is rotated by a gear 241 on the lower side of and integral with cam 230. The gear 241 is engaged by a gear 241a secured to a shaft 241b suitably journalled in the housing and operated by means which will be described later. In order that fuel does not leak past components of the valves V1, V2 and V3, seal rings (Fig. 7) 242, 243, 244, 245 and 246 are provided, the ring 246 being located between a flange of sleeve 175 and a ring 247 received by a recess in housing 110 and sealed by an O-ring 248.

The fuel which is passed by the valves V1, V2 and V3 from the surrounding chamber 136 to the interior of tube 150 can flow out through side holes 250 of the tube and side holes 251 of bearing 140 and thence into a duct 252 corresponding to pipe 3 of Fig. 1. Duct 252 in housing 110 (Fig. 7) is connected with duct 253 in housing 111 (Fig. 28). A connection can be made between duct 253 and the burner manifold by a coupling which is secured by nuts cooperating with studs 254. Duct 253 also corresponds to pipe 3 of Fig. 1.

For the purpose of rotating tube 150 90° from normal position for purposes of check-out, tube 150 is provided with a gear 260 (Fig. 7) which, as shown in Fig. 5, meshes with a rack 261 formed on the upper surface of a rod 262 slidable in a bearing 263 and connected with a piston 264 in a cylinder 265, the right end of which is closed by a wall of housing 111 which has a recess 266 for receiving a seal ring 267 positioned in a groove formed in the outer surface of a flange 268 of the cylinder. The piston 264 is urged to the right by a spring 269 which tends to maintain the tube 150 in the normal position shown in Fig. 7. When check-out or when semi-automatic control is desired, pressure fluid is admitted to the right end of cylinder 265 by means to be described, thereby causing piston 264 to move left to effect 90° rotation of gear 260 and tube 150.

Referring to Figs. 6, 7 and 20–23, the control of calculator D1 (Fig. 1) will be explained. The shaft 75 of governor G (Fig. 2) corresponds to connection 14 of Fig. 1 and the sleeve 94 surrounding shaft 75, as shown in Figs. 6 and 20 corresponds to the connection 15 of Fig. 1. As shown in Fig. 20, shaft 75 is connected by meshing gear segments 270 and 271 with a bevel gear 272 loosely journalled on a rod 273 supported by housing 110 and by a bracket 274 which screws 275 (Fig. 7) attach to housing 110, the upper end of rod 273 extending into a projecting portion of the bracket which surrounds the rod as indicated in Fig. 20. The sleeve or hollow shaft 94 drives a cam 280 secured to the shaft and engaged by a follower 281 (Figs. 21 and 7) mounted on a lever 282 which a spring 283 urges counter-clockwise in Fig. 7 so that the follower always engages the cam. Lever 282 extends from a hub 285 which, as shown in Fig. 22, is journalled on bearings 286 supported by a rod 287 fixed to housing 110. The hub 285 is prevented from moving axially on the rod by a washer 288 which a screw 289 fixes to rod 287. An angular arm 290 extends from the hub 285 and formed on such arm, as shown in Fig. 7, is an internal gear segment 291 which meshes with a gear 292 formed on the lower end of a sleeve 292a rotatable on shaft 273 and having at its upper end a bevel gear 293. Bevel gears 272 and 293 mesh with a bevel gear 294 journalled on a spindle 295 and retained by a nut 296. Spindle 295 extends from a hub 297 which has projecting therefrom a gear 298 meshing with a gear 299 formed on an arm 299a which extends from a hub 300 journalled on bearings 301 supported by rod 302 fixed to housing 110. Hub 300 is prevented from axial movement by a washer 303 which a screw 304 secures to the end of rod 302. As shown in Fig. 23, an arm 305 extends from hub 300 and is bifurcated to form a fork 306, the branches of which have slots 307 for receiving pins 308 extending from a block 309 which, as shown in Fig. 7, is located upon rod 183 and between nuts 309a threaded on said rod. By turning these nuts, the relation of piston valve 180 to arm 305 can be adjusted.

The calculator D1 (Fig. 1) includes the bevel gears 272, 294 and 293. The input to the calculator which is represented by line 14 in Fig. 1 is provided by shaft 75 and its connections with gear 272. The input to calculator D1, which is represented by line 17 in Fig. 1, is provided by cam 280 and its connections with gear 293. The output of calculator D1, which is represented by line 18 of Fig. 1, is provided by the connections between bevel gear 294 and the piston valve 180. Since gear 294 is operable in response to movements of both gear 272 and gear 293, the movements of arm 305 and valve 180 are controlled by both shafts 75 and 94 of the governor mechanism.

As shown in Fig. 7, the cam 280 is in equilibrium position with a radial line marked zero adjacent to cam follower 281. During acceleration, that portion of the cam marked ACC effects control of valve V2 through the calculator D1 for the purpose of preventing surge. During deceleration, that portion of cam 280 marked DEC effects control of valve V2 for the purpose of providing proper fuel supply during deceleration.

The mechanism contained in the housings 111 and 112 will now be described. Referring to Fig. 27, the conduit which constitutes pipe 5 of Fig. 1 is formed in both the housings 111 and 112. The valve Vd, which controls flow from pipe 5 to pipe 4a, through one or the other of valves V4 or Ve, in the position shown in Fig. 27 permits flow directly from pipe 5 to the inlet of the by-pass valve V4 represented by the arc V4I in Fig. 27. The outlet of the valve V4, which is represented by the arc V4O in Fig. 27, is connected directly with pipe 4 and the latter is also connected with the outlet of the emergency by-pass valve Ve as indicated in Fig. 27. The inlet of the emergency by-pass valve, designated by the arc VeI in Fig. 27 is connected to pipe 5a and the outlet designated by arc VeO is connected with pipes 4 and 4a. The passage 5 is connected with passage 5a when the valve Vd is rotated 90° from the position shown.

More specifically, the chamber 135 (Fig. 24) which receives fuel after passing through filter f is shown in Fig. 35 in association with the by-pass valves controlling the by-pass passages. This chamber is connected with a passage 322 in the housing 112. The passages 320, 321 and 322 correspond to pipe 5 in Fig. 1 and they lead to valve Vd, which, in Fig. 35, has the same position as shown in Fig. 1 to connect passage 322 with a passage in a coupling 323 between housings 111 and 112 which connects with a passage 324 which leads to the inlet V4I of valve V4, which will be described more fully later. When valve Vd is turned counter-clockwise 90°, in Fig. 35, it will connect passage 322 with passage 325 (corresponding to pipe 5a, Fig. 1) which leads to inlet VeI of valve Ve, which will also be more fully described later, and will block flow to passage 324. Referring to Fig. 30 which shows valves V4 and Ve, the inlets V4I and VeI of these valves are shown. The outlets V4O and VeO of these valves are connected by a coupling 326 which appears in Figs. 30 and 35 and the outlet of valve Ve is connected with a passage 327 (Fig. 35) corresponding in function to pipe 4 of Fig. 1.

Referring to Figs. 28 and 30, valve V4 includes a piston valve 330 having lands 331, 332, 333 and 334 which have a sliding fit with cylindrical surfaces provided in a valve cage 335 which is positioned in a recess 335a formed in the housing 111 and held in place by a snap ring 336. Leakage around the cage is resisted by seal rings 337. The cage 335 has formed therein a plurality of ducts 338 connecting inlet V4I with the space around the valve 330 above the land 332. The cage 335 has side ports 339 for connecting the interior of the cage with an annular groove 340, which constitutes oulet V4O and which is connected by the coupling 326 with valve outlet VeO. Since the inlet V4I is connected with the outlet of pump P (Fig. 1) the burner fuel exerts pressure $p2$ upon the piston valve 330, tending to move it down in Fig. 30. The cylinder 341 in which the land 334 slides is closed by a cover 342. As shown in Fig. 28, the cylinder 341 is connected with duct 253 corresponding to pipe 3 of Fig. 1 by ducts 343, 344, 345, coupling 346, and duct 347. The elements 343 to 347 constitute pipe 6 of Fig. 1. Therefore, the unit pressure in cylinder 341 is $p3$ which represents unit pressure in pipe 3. Unit pressure $p3$ tends to move valve 330 up in Fig. 30. Valve 330 is also urged upwardly by a spring 350 which corresponds in function to spring 20 in Fig. 1. This spring is confined between a flange extending outwardly from a member 351 and the bottom of a piston 352 corresponding to piston 21 (Fig. 1). The force which the spring 350 exerts upon member 351 is transmitted to valve 330 by a rod 353 slidable in a passage formed on a centrally positioned extension 342a of the cover 342 and extending through the cover. The piston 352 slides in a cylinder 355 corresponding to cylinder 22 (Fig. 1), said cylinder being a sleeve inserted in a recess in housing 111.

The admission of pressure fluid to cylinder 355 or release therefrom is controlled by a piston valve 360, best shown in Fig. 30, and which corresponds to valve PV (Fig. 1). Valve 360 has lands 361 and 362 and it slides in a valve sleeve 363 receives in a recess 364 formed in a depending portion of the cover 115a. Leakage around the sleeve 363 is resisted by seals 365. Inlet V4I is connected by a duct 366 with an annular groove 367 in sleeve 363 which ports 368 connect with the interior of the sleeve. The valve outlet V4O, which is the groove 340, is connected by a duct 369 with an annular groove 370 of sleeve 363, the groove being connected with the interior of the sleeve by ports 371. The sleeve 363 also has ports 372 connecting the interior of the sleeve with an annular groove 373 which is connected with the bottom of cylinder 355 by a series of ducts (not shown), which correspond in function to the duct 23 of Fig. 1.

The valve 360 is caused to move upwardly or downwardly in response to variations in different variable factors and is operated by a calculator which is actuated in response to variations in these factors in a manner more fully described later, and movements of the valve 360 have a controlling effect on the functioning of the valve V4 and the operation of the by-pass mechanism. So far as the function of valve 360 is concerned, if it is caused to move upwardly fuel, at pressure $p2$, which is the pressure on the outlet side of the high pressure pump P, will flow through passage 366, ports 372, 375 and the ducts (not shown) leading to the bottom of cylinder 355 to cause the piston 352 to move upward. This will increase the compression of spring 350 and will cause land 332 to block off more of the side ports 339 from communication with passages 338, thus decreasing the by-passing action between the duct 324 and groove 340 so that less fuel is by-passed and more fuel will flow to the burner manifold.

When valve 360 is moved down from its neutral position, which is shown in Fig. 30, the port 372 is connected with port 371 and fuel can flow from cylinder 355 through the ducts (not shown) into port 372, through port 371 and passage 369 to groove 340. This will reduce the spring pressure on valve V4 permitting such valve to move down, increasing the effect of the by-pass and reducing the amount of fuel supplied to the burners.

Pilot valve 360, or PV, as designated in Fig. 1, is controlled by the calculator D2 shown in Figs. 33 and 34, and this calculator is operated in response to various factors, such as compressor pressure and others. It has a valve actuating arm numbered 25, since it corresponds in function to connection 25 of Fig. 1. It also has an arm 26 which is moved in response to variations in compressor pressure and corresponds to connection 26 of Fig. 1. This arm can be adjusted in effective length. For this purpose, it includes an arm 380 directly connected with calculator D2, and an arm 381 which is slidable in a guide 382 integral with arm 380, as best shown in Fig. 34. Lugs 383 and 384 extend, respectively, from parts 381 and 382 and are threaded to receive a screw having threaded portions 385 and 386, respectively of opposite pitch and extending in opposite directions from a knurled disc 387. By turning the disc 387, the arm portion 381 can be adjusted lengthwise relative to the arm portion 380. This varies the effective length of arm 26 and when adjustment has been made to obtain the length desired, a screw 388 is tightened to maintain the adjustment.

The arm assembly 26 is moved by a bellows unit B1 (Figs. 28 and 29) which is movable in response to variations in compressor pressure. Unit B1 can be either of two forms shown in Figs. 36 and 37. Fig. 36 shows a bar 390 having a notch 391 which receives a roller 392 pivotally supported by arm assembly 26 (Fig. 28). Bar 390 connects movable heads 393 and 394 of two bellows 395 and 396, respectively, connected with relatively fixed heads 397 and 398, respectively. Bellows 396 is evacuated through a pipe 399 which is sealed after evacuation. The collapsing movement of bellows 396 is limited by a stop tube 400 positioned inside the bellows. The expansion of bellows 395 is resisted by a tension spring 401 connected with rod 390 and engaging a washer 402 supported by the head of a screw 403 which is threaded through a plug 404 threaded into a fixed part 405 which is a part of or fixed to the housing 111 and in which a duct 406 is provided to connect the interior of bellows 395 with a pipe tapped hole 407 in which one end of a conduit connecting the interior of the bellows with a part of the compressor is adapted to be secured in any suitable way. This conduit may lead to the outlet of the compressor or it might lead to some point between the inlet and the outlet. The bellows 395 and 396 have equal area so that the bellows unit is not affected by changes in surrounding pressure. Therefore, bellows 395 senses compressor pressure absolute at the point where the conduit leading to the bellows is connected. The spring 401 can be adjusted by turning the screw 403 and after the adjustment has been made, it is retained by tightening the lock nut 408 which is protected by a cover 409 threaded on the plug 404. Bellows head 398 is brazed to a seat 421 having a shank 422 which passes through a hole in housing 111 and has a threaded portion 422a which receives a nut 422b that is tightened to hold the bellows in position.

The bellows unit shown in Fig. 37 is somewhat similar to that shown in Fig. 36 and corresponding parts are referred to by the same numbers with primes affixed. The bellows 395' surrounds a tube 410 attached to head 397' and attached to the lower end of a bellows 411 which is positioned within the tube and the upper end of which is attached to a head 412 having threaded connection with a rod 413 which is screwed into the head for transmitting force to the rod 390'. A snap ring 414 secures to head 412 a member 415 having an outwardly extending flange 415a engaged by the upper end of a compression spring 416 the lower end of which bears against the tube 410. An intermediate convolution of bellows 411 engages an annular member 417 through which the rod 413 extends, as shown in Fig. 37. The space within the bellows 395' is connectable by a duct 418 and by other connections, not shown, with the intake of the compressor. The interior of bellows 411 is, therefore, in communication with the compressor intake. The compressor outlet is connected in any suitable manner with the space between the inside of tube 410 and the outside of bellows 411. It is, therefore, apparent that the rod 391' is subjected to a pressure which is a resultant or combination of compressor inlet and outlet pressures. The collapsing of below 396' which is evacuated through a tube 399' is resisted by the spring 420'.

The adjustment of the bellows unit B1, shown in Fig. 37, is effected as shown in Fig. 28. The head 398' is fixed to a spring seat 421' having a shank 422' received in a recess 423 provided by housing 111. Member 421' has a hole 424 which threadedly engages the end of a screw 425 extending through a screw plug 426 threaded into housing 111 and receiving a nut 427 for locking plug 426 in a position of adjustment. After the adjustment has been made, screw 425 is passed through a cap 428 and through the plug 426 and is threaded into the tapped hole 424 to draw the shank 422' against the plug 426.

The vertical position of bar 390 or bar 390' in Figs. 36 and 37 is a determining factor through the calculator D2, on the location of the valve 360 (Fig. 30) for demanding either a decrease or increase in by-passing action; and, when the demanded by-passing action has been obtained, the valve 360 is returned to neutral position by a follow-up device which part 28 (Fig. 1) represents. This follow-up device is shown in Figs. 30 and 34, and includes rollers 430 journalled on pins 431 extending diametrically opposite from the piston 352 and received by the notches formed adjacent the end of each arm 432 of bifurcated lever 433 connected, as shown in Fig. 34, with a shaft 434 supported in bearings 435 and connected by bevel gears 436 and 437 with a shaft 438 of calculator D2, said shaft 438 corresponding in function to connection 27 in Fig. 1.

The operation is substantially as follows. The valve 360 which corresponds to valve PV is operable in response to changes in compressor pressure by the calculator D2 through the medium of arm 25 connected to the valve and moved by one of the gears of the calculator. Movement of the arm 25 is effected when another gear of the calculator is moved by the lever assembly 380 which is moved by the bellows assembly B1, being connected to rod 390 which is moved in one direction by increase in compressor pressure, and in the opposite direction upon decrease in such pressure.

Movement of valve 360 in one direction causes fluid to flow into cylinder 355 to raise piston 352, increasing pressure of spring 350 and reducing the flow through the by-pass, to increase fluid flow to the burners, while upon movement of the valve 360 in the other direction, fluid flows out of cylinder 355 and the action is the reverse of that described. Movement of the piston 352 stops the valve 360 in its position of equilibrium when the piston has moved sufficiently for the proper increase or decrease in fuel flow to be brought about through the medium of the above-described connections which rotate shaft 434 to rotate shaft 438 of the calculator. This moves arm 25 to restore valve 360 to its position of equilibrium in which flow to or from cylinder 355 is prevented.

The position of the piston 352 is determined by compressor pressure, either inlet or outlet pressure, or pressure between inlet and outlet, or a combination of inlet and outlet pressures, if the bellows unit of Fig. 37 is employed. Obviously, the angular position of shaft 434 is also determined by compressor pressure. As already pointed out, the valve V3 is also positioned in accordance with compressor pressure through the medium of the connection designated 19 in Fig. 1. The mechanism actually employed to effect movement of the valve V3 is the shaft 434 which rotates gear 440 secured thereto as indicated in Fig. 34. This gear operates a gear 441 secured to a short shaft 442 suitably journalled in the housing and a bevel gear 443 thereon meshes with another gear 444 secured to the shaft 241b. Through this train of connections movement of shaft 434 in response to variations in compressor pressure is effective to rotate the cam 230 to effect movements of valve V3 in the manner previously described.

Line 29 (Fig. 1) represents a mechanism for making an initial adjustment of calculator D2. Referring to Figs. 31 and 33, the components of mechanism 29 include a shaft 450 which is a part of calculator D2 and which is connected with a gear 451 meshing with a helical screw gear 452 provided by a shaft 453 journalled in bearings 454 and 455. The shaft 453 can be turned by applying a screwdriver to its slots 456. After the adjustment of the shaft 453 has been made, a lock nut 457 threaded on shaft 453 may be tightened against the housing 111 to maintain the adjustment thereby causing a shoulder 458 formed on shaft 453 to press against a portion of housing 111. The nut 457 and the slots 456 are enclosed by a cap 459 attached to shaft 453 by a screw 460.

As already stated, there is an operating connection between the calculator D3 which is subject to variations in ambient temperature and the calculator D2 which controls valve PV as indicated by the line 30. The mechanism which constitutes this connection is shown in Figs. 31, 33 and 34 and comprises an arm 30a of calculator D3, a link 30b connecting this arm with an arm 30c of calculator D2. Movements of arm 30a will effect movements of arm 30c and movements of calculator D2. This will effect control of fuel flow in accordance with the movement of the calculator D3.

As stated in the description of the diagram of Fig. 1, the action of calculator D2 is controlled in part through the medium of a mechanical operating connection from the pilot's control lever PL to calculator D3 which is connected with calculator D2 as previously described, such mechanical connection being represented by the line 32 of Fig. 1. This mechanical connection is embodied in a construction shown in Figs. 29, 30, 31 and 34. Referring to Fig. 29, the throttle operating shaft TS is connected by gears 470 and 471 with a clamping hub 472 which, by tightening a nut 473 on a screw 474, can be attached to a shaft 475 in the desired position of angular adjustment. Shaft 475, which is journalled in bearings 476, is surrounded by a clamping hub 477 similar to hub 472 integral with or suitably secured to a cam 478 which, as shown in Fig. 31, is engaged by a roller 479 suitably mounted on a pin 479a extending from an arm 480 which a spring 483 urges clockwise (Fig. 29) to hold roller 479 against cam 478. Arm 480 has a clamping hub 481 by which it can be secured in the desired position of angular adjustment with respect to shaft 482 which is part of calculator D3. The cam 478 is contoured so that the shaft of calculator D3 will be positioned as desired in accordance with the position of pilot's lever PL.

The calculator D3 is also operated in accordance with variations in ambient temperature through a connection represented by line 33 in Fig. 1. The mechanical connection represented by line 33 includes shaft 490 of calculator D3 (Figs. 32 and 32A), arm 491 secured by suitable clamping means to shaft 490. The arm has a laterally extending pin 492 on which is suitably mounted a roller 493 received in a slot 494 formed in one end of a lever 495 pivoted on a pin 496, suitably secured in the flattened upper end, as seen in Fig. 32A, of a rod 497 which extends from one end of a temperature responsive bellows 497a and toward the shaft 434. The lever 495 retained on the pivot pin by any suitable means and its upper end as seen in Fig. 32A engages a cam 498 in the manner indicated in Fig. 32A. The cam is retained between a laterally extending flange 498a and a lock nut 498b having threaded engagement with the shaft, as indicated in Fig. 32. A spring 499 holds the lever 495 in contact with the surface of the cam. The bellows is filled with an expansible medium which expands or contracts upon change in temperature, moving lever 495 upwardly, as seen in Fig. 1, upon increase in temperature and downwardly upon a decrease in temperature.

With the cam in the position shown in Fig. 32A, with the lever 495 engaging the low point of the cam vertical movements of the rod 497 and said lever bring about no rotative movements of the lever, as when the cam is in this position it is not desirable that variations in ambient temperature effect any movement of the calculator arm 491. It is apparent that when the lever is in the Fig. 32A position, the edge of the lever which engages the cam lies in a vertical plane so that vertical movements effect no angular movements, but when the lever engages any other part of the cam, the edge of the lever which contacts the cam no longer lies in a vertical plane but is at an angle to the vertical. Therefore, vertical movements of the lever, when in any position other than that shown in Fig. 32A, will effect angular or rotary movement of the lever, upward movement effecting counterclockwise rotation and downward movement effecting clockwise rotation. These movements effect rotation of arm 491 and movements of the valve controlled by the calculator.

It is also apparent that if the temperature is constant and the vertical position of lever 495 does not change, any rotation of cam 498 by shaft 434 will effect rotary movements of lever 495 and movements of arm 491 and movements of the valve controlled by the calculator.

The details of calculator D2 appear in Fig. 38. Shaft 438, which is a component of the mechanism represented by line 27 of Fig. 1 and shaft 450 which is a component of the mechanism indicated by line 29 of Fig. 1, are supported by aligned bearings 500 which are in aligned cages 501 which, as shown in Fig. 40, are connected by integral yokes 502. Rings 503 retain the bearings 500 which are engaged by spacing washers 504 located with respect to the surrounded shaft by snap ring 505. Shaft 438 has a reduced extension which telescopes into a suitable recess in the end of shaft 450 near the center of the calculator. Shaft 438 is connected with a bevel gear 510 meshing with a bevel gear 511 journalled on bearings 512 surrounding a spindle 513 extending from the hub of the arm 30c which is journalled on bearings 514 and connected with calculator D3, as previously described. Clamp nut 513a retains gear 511 in position on its supporting spindles. Gear 511 meshes with a bevel gear 515 on one side of a disc 516 journalled on bearings 517 and having a bevel gear 518 on its opposite side which meshes with a bevel gear 519 journalled on bearings 520 supported by a spindle 521 extending from the hub of arm 26 which is journalled on bearings 522. A clamp nut 523 retains the gear 519 on its supporting spindle. Gear 519 meshes with a bevel gear 525 formed on one face of a member 525a and having on its opposite face a bevel gear 527 meshing with a bevel gear 528 journalled on bearings 529 supported by a spindle 530 extending from the hub of arm 25 which is journalled on bearings 531. A clamp nut 532 retains gear 528 on its supporting spindle. Gear 528 meshes with a bevel gear 535 connected with shaft 450. As shown in Fig. 29, the cages 501 are received in cradles 540 provided by cover 115a and retained by caps 541 which screws 542 to the cradles 540.

The operation of this calculator is, very briefly, as follows. The arm 25 is actuated by the calculator to move the valve PV. Shaft 438 is operated by the piston 352, shaft 450 is operated manually to effect initial adjustment of the calculator, arm 26 is operated in response to variations in compressor pressure, and arm 30c is operated by calculator D3 in response to variations in ambient temperature. By reason of the intermeshing gear construction of the calculator, any movement of the shaft 438, shaft 450, arm 26 or arm 30c will bring about a movement of arm 25 and the element operated thereby.

The parts of calculator D3, shown in Fig. 39, are similar to parts of calculator D2. Shaft 482 which is a component of the mechanism designated by line 32 (Fig. 1) and shaft 490 which is a component of the mechanism designated by line 33 (Fig. 1) are journalled in bearings 550 supported by cages 551 and retained by rings 553 and by washers 554 contiguous to snap rings 555 in grooves of the shafts. Shaft 482 drives a bevel gear 556 meshing with a bevel gear 557 supported by a spindle 558 extending from the hub of lever 34. Gear 557 meshes with a gear 559 formed on one side of a gear member 560 which has on the opposite side a bevel gear 561 meshing with a bevel gear 562 supported on a spindle 563 extending radially from the hub of arm 30a. Gear 562 meshes with a bevel gear 564 formed on a gear member 564a connected with shaft 490. The cages 551 are received in cradles 570 provided by housing 111 and are retained by caps 571 which screw 572 attaches to the cradles.

The operation of calculator D3 will be obvious in view of the above brief description of the operation of the calculator D2.

Referring to Fig. 31, the valve Vd of Fig. 1 is connected with a shaft 580 pivotally supported by a disc 581 having a seal ring 582 mounted in a groove therein and retained in a cylinder 583 of housing 112 by a snap ring 584. Shaft 580 has a gear segment 585 secured thereon and such segment meshes with a segment 586 pivotally supported on a reduced extension of a stud 587 screwed into the housing 111 pivotally connected by a pin 588 with a link 589 which, as shown in Fig. 33, is connected with a rod 590 of a piston 591 movable in a cylinder 592 and urged left by a spring 593 into such position that valve Vd is in the normal position shown in Fig. 1. By admitting pressure fluid to the left end of cylinder 592, the piston 591 is caused to move right to effect 90° rotation clockwise on Fig. 1 of valve Vd for purpose of emergency in order to disconnect the main by-pass valve V4 and to connect the emergency by-pass valve Ve.

Referring to Fig. 30, emergency by-pass valve Ve includes a movable member 600 having lands 601, 602 and 603 which have a sliding fit with cylindrical surfaces provided in a valve cage 604 retained by a snap ring 605 and supporting seal rings 606. A narrow land 610 is provided on this valve cage and cooperates with the valve land 601. Land 610 may be more or less uncovered by flow metering notches 611 of valve 600. As in the case of the movable element 330 of valve V4, valve 600 is subjected to pressure p2 above the valve and to the upward force of a spring 612 confined by a fixed spring seat 613 formed by the closed end of a cylinder 613a in which the spring is recessed and a movable spring seat formed by a flange extending laterally from the member 614. The lower end of stem 615 of valve 600 extends into a recess formed in this member 614, as shown in Fig. 30. The location of valve 600 is thereby determined by the relation of the downward pressure upon valve 600 due to unit pressure $p2$ and the force of spring 612. The bypassing action by this emergency valve Ve is, therefore, commensurate with a pressure differential across the main throttle valve which is then controlled entirely by the pilot.

The mechanism for operating gear 260 to rotate tube 150 for purposes of check-out and for supplying fluid to cylinder 592 to operate the valve Vd to disconnect the main by-pass valve V4 and connect the emergency by-pass valve Ve is shown in Fig. 42.

Fig. 42 shows diagrammatically valves 620 and 621 controlled, respectively, by solenoids 622 and 623. These valves normally block entrance of pressure fluid to the cylinders 265 and 592, respectively, and connect them with drain or the low pressure pipe $p1$, so that springs 269 and 593 are normally effective to position the pistons 264 and 591 in the positions shown in Fig. 42 and in Figs. 5 and 33. Wires 625 and 626 receive current from a suitable current source for energizing the solenoids.

When switch 627 is closed solenoid 622 is energized and the tube 150 (Fig. 7) is turned 90° for "check-out."

Before takeoff, switch 628 is closed to connect wire 626 with a parallel circuit including switches 629 and 630. If the fuel flow to the burners is normal, fluid pressure against a diaphragm 631 holds switch 629 open against the action of a spring 632 and solenoid 623 is not energized. In emergency, switch 630 is closed and solenoid 623 is energized and normal by-pass valve V4 is disconnected and emergency by-pass valve Ve is connected. If, during take-off or in any other regime, the fuel pressure in the burner manifold should become abnormally low, switch 629 will become closed by spring 632 and the result will be the same as when switch 630 is closed.

In Fig. 41, various lines show the relation of fuel flow to speed. Line D—E indicates the fuel-speed relation for idling. Line E—F—G indicates fuel which can be obtained by opening valve V1 to effect speed increase from idle value X to maximum value Z. Line E—H—I indicates the maximum fuel which can be obtained for speed increase by opening vernier valves V2 and V3 in addition to opening valve V1. Line E—J—K indicates the effect of the governor in reducing fuel flow through vernier valve V2 so that any selected speed up to the maximum allowable speed will not be exceeded and will be maintained. Lines E—F—G, E—H—I and E—J—K represent steady state control, such as in the cruising regime where rapid acceleration is not effected.

Line L—J indicates the fuel which can be obtained by opening valve V1 suddenly for rapid acceleration. Line M—J indicates additional fuel which could be obtained for rapid acceleration, if no surge preventing means were used, during the interim from the time when governor speed setting is suddenly changed to the time when the governing operation returns to steady state control. Line N—O—P represents a schedule of the fuel and speed relations for a particular engine at which compressor surge will begin. Any relations on or above line N—O—P are in the surge range. The surge preventing mechanism associated with the governor causes control by the governor to be that represented by line M—Q—R—J.

When it is desired to accelerate from speed Y to speed Z as rapidly as possible, the fuel flow is caused to increase from a value S to a value T on little QR then to increase to values represented by line T—R—J.

In Fig. 41, vertical line A represents a position of pilot's lever PL for maximum speed setting. The lever is then against a stop-gate. By shifting the lever PL sidewise, it can be passed from the gate and then be rotated further to position represented by line B. This rotation of lever PL causes main valve V1 to open still wider and vernier valve V2 to close partly so that the governor effects control in a narrower band. This condition is called "stand-by." By rotating lever PL still further in the same direction as before to a position represented by line C, valve V1 is opened to fullest extent and valve V2 is entirely closed. The governing band is reduced to zero. If speed does not change, this is an indication that the governor is functioning properly. Therefore, position C is known as "check-out."

While the embodiment of the present invention as herein disclosed constitutes a preferred form, it is to be understood that other forms might be adopted.

What is claimed is as follows:

1. Apparatus for controlling an airplane propelling jet engine and comprising a main throttle valve for connecting the outlet of a fuel-pressurizing pump with the burner fuel manifold of the engine, a vernier throttle valve in parallel with the main valve, means for maintaining a pressure differential across the throttle valves in accordance with density of air passing from the engine compressor to the burners, an engine speed sensing governor for controlling the vernier valve and manually operable means for controlling the main valve and for controlling the vernier valve in proportion to the manually effected control of the main valve and for adjusting the governor for control of fuel flow to maintain a selected speed.

2. Apparatus for controlling an airplane propelling jet engine and comprising a main throttle valve for connecting the outlet of a fuel-pressurizing pump with the burner fuel manifold of the engine, a vernier throttle valve in parallel with the main valve, means for maintaining a pressure differential across the throttle valves in accordance with density of air passing from the engine compressor to the burners, an engine speed sensing governor for controlling the vernier valve, a member operated by the governor in accordance with attained engine speed, means under control by said member for modifying the control of the vernier valve by the governor so as to prevent compressor surge and manually operable means for controlling the main valve and for adjusting the governor for control of fuel flow to maintain a selected speed.

3. Apparatus for controlling an airplane propelling jet engine and comprising a main throttle valve for connecting the outlet of a fuel-pressurizing pump with the burner fuel manifold of the engine, a vernier throttle valve in parallel with the main valve, means for maintaining a pressure differential across the throttle valves in accordance with density of air passing from the engine compressor to the burners, an engine speed sensing governor, a first movable member actuated thereby for determining a fuel flow for steady state operation in accordance with the speed setting of the governor, a second movable member positioned thereby in accordance with attained engine speed, a third member, means under control by the second member for positioning the third member so as to avoid compressor surge during acceleration and so as to avoid burner blow-out during deceleration, means under joint control by the first and third members for controlling the vernier valve and manually operable means for controlling the main valve and for adjusting the governor for control of fuel flow to maintain a selected speed.

4. Apparatus for controlling an airplane propelling jet engine and comprising a main throttle valve for connecting the outlet of a fuel-pressurizing pump with the burner fuel manifold of the engine, a vernier throttle valve in parallel with the main valve, means for maintaining a pressure differential across the throttle valves in accordance with density of air passing from the engine compressor to the burners, an engine speed sensing governor having a speed setting device, a first movable member actuated thereby for determining fuel flow for steady stated operation in accordance with the speed setting of the governor, manually operable means for controlling the main valve and for adjusting the speed setting device of the governor, a motion controlling cam having a normal position, means under control by the speed setting device for moving the cam in one direction or the other from its normal position depending on whether the speed setting device is adjusted for higher or lower governed speed, a second member operated by the governor for movement indicative of attained engine speed, a mechanism operated thereby for returning the cam to its normal position when selected speed is attained, a third member controlled by the cam and means under joint control by the first and third members for controlling the vernier valve, said cam having a contour such that fuel control by the cam avoids compressor surge during acceleration and burner blow-out during deceleration.

5. Apparatus for controlling an airplane propelling jet engine and comprising a throttle valve for connecting the outlet of a fuel-pressurizing pump with the burner fuel manifold of the engine, and means for variably establishing a pressure differential across the throttle valve, said means comprising a valve for controlling a bypass around the pump, said valve being exposed to the force of pressurized fuel tending to open it, means for subjecting the bypass valve to a force tending to close it and derived from fuel-pressure posterior to the throttle valve, a spring for applying a force to the bypass valve tending to close it, means for determining the force applied by the spring, means sensitive to density of air flowing from the engine compressor to the burners, means sensitive to position of the throttle valve and a calculator under control by both of said sensitive means for controlling the spring force determining means.

6. Apparatus for controlling an airplane propelling engine and comprising a fuel-pressurizing pump, a manually operable throttle valve for connecting the pump outlet withe the burner fuel manifold, two bypasses for connecting the pump outlet with the pump inlet, bypass controlling valves in each bypass and each subjected, when its bypass is opened, to force tending to open it and in proportion to fuel-pressure anterior to the throttle valves, means providing with respect to each bypass valve for application of force tending to close it and in proportion to fuel-pressure posterior to the throttle valve, means subjecting one of the bypass valves to a force tending to close it in proportion to the density of air passed by the compressor to the burners, a spring urging the other bypass valve toward closed position, and a two-way valve for switching from one bypass to the other.

References Cited in the file of this patent

UNITED STATES PATENTS

| Number | Name | Date |
|---|---|---|
| 1,309,611 | Bungay | July 15, 1919 |
| 2,002,761 | Armstrong | May 28, 1935 |
| 2,422,808 | Stokes | June 24, 1947 |
| 2,562,361 | Kasten | July 31, 1951 |
| 2,575,900 | Vokes | Nov. 20, 1951 |
| 2,616,254 | Mock | Nov. 4, 1952 |
| 2,644,513 | Mock | July 7, 1953 |
| 2,688,229 | Lee | Sept. 7, 1954 |
| 2,691,268 | Prentiss | Oct. 12, 1954 |
| 2,693,081 | Russ | Nov. 2, 1954 |
| 2,705,047 | Williams et al. | Mar. 29, 1955 |
| 2,772,728 | Malick | Dec. 4, 1956 |
| 2,786,331 | Williams | Mar. 26, 1957 |

FOREIGN PATENTS

| Number | Country | Date |
|---|---|---|
| 646,780 | Great Britain | Nov. 29, 1950 |

UNITED STATES PATENT OFFICE
Certificate of Correction

Patent No. 2,849,862 September 2, 1958

Clarence H. Jorgensen et al.

It is hereby certified that error appears in the printed specification of the above numbered patent requiring correction and that the said Letters Patent should read as corrected below.

Column 10, line 17, for "V4O" read $V_4O$; line 18, for "VeO" read $V_eO$; line 29, for "V4I" read $V_4I$; line 33, for "V4O" read $V_4O$; line 34, for "V4I" read $V_4I$; line 67, for "V4O" read $V_4O$; column 12, line 66, for "D2" read $D_s$; column 13, line 21, for "V3" read $V_s$; line 24, for "V3" read $V_s$; line 32, for "V3" read $V_s$; line 48, for "D3" read $D_s$; line 59, for "D2" read $D_s$; line 61, for "D3" read $D_s$; column 15, line 14, after "542" insert *secure*; column 16, line 73, for "little" read *line*; column 18, line 42, for "withe" read *with*.

Signed and sealed this 10th day of March 1959.

[SEAL]

Attest:
KARL H. AXLINE,
*Attesting Officer.*

ROBERT C. WATSON,
*Commissioner of Patents.*